US011937270B2

(12) United States Patent
Liu et al.

(10) Patent No.: US 11,937,270 B2
(45) Date of Patent: Mar. 19, 2024

(54) TECHNIQUES FOR CONFIGURING TCI STATES FOR MBS TRANSMISSIONS

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/394,137

(22) Filed: Aug. 4, 2021

(65) Prior Publication Data

US 2023/0039425 A1 Feb. 9, 2023

(51) Int. Cl.
*H04W 72/02* (2009.01)
*H04W 72/044* (2023.01)
*H04W 72/30* (2023.01)

(52) U.S. Cl.
CPC ........... *H04W 72/30* (2023.01); *H04W 72/02* (2013.01); *H04W 72/044* (2013.01)

(58) Field of Classification Search
None
See application file for complete search history.

(56) References Cited

U.S. PATENT DOCUMENTS

| 11,617,168 | B2* | 3/2023 | Park | H04B 7/086 |
| | | | | 370/329 |
| 2020/0112941 | A1* | 4/2020 | Yerramalli | H04W 76/40 |
| 2021/0120529 | A1* | 4/2021 | Park | H04L 5/0094 |
| 2021/0135802 | A1* | 5/2021 | Zhou | H04L 5/0091 |
| 2022/0217621 | A1* | 7/2022 | Papasakellariou | ......... |
| | | | | H04W 28/0215 |
| 2022/0232403 | A1* | 7/2022 | Lee | H04W 72/0446 |
| 2022/0239428 | A1* | 7/2022 | Lee | H04W 48/10 |
| 2022/0272662 | A1* | 8/2022 | Kim | H04W 72/23 |

(Continued)

FOREIGN PATENT DOCUMENTS

WO WO-2022006849 A1 * 1/2022
WO WO-2022153241 A1 * 7/2022

(Continued)

*Primary Examiner* — Kodzovi Acolatse
(74) *Attorney, Agent, or Firm* — Holland & Hart LLP

(57) ABSTRACT

Methods, systems, and devices for wireless communications are described. A user equipment (UE) may receive signaling indicating a group of transmission configuration indicator states including a first subset associated with a first bandwidth part and a second subset associated with a common frequency resource. The UE may determine, based on the group of transmission configuration indicator states, a transmission configuration indicator state list arrangement indicating a first state list associated with the first bandwidth part and a second state list associated with the common frequency resource. The UE may select, based on the transmission configuration indicator state list arrangement, a transmission configuration indicator state sharing scheme or a transmission configuration indicator state separation scheme. The sharing scheme may include at least one transmission configuration indicator state that may be common between a unicast transmission configuration and a multicast transmission configuration.

18 Claims, 16 Drawing Sheets

(56) References Cited

U.S. PATENT DOCUMENTS

| | | | | |
|---|---|---|---|---|
| 2022/0304026 A1* | 9/2022 | MolavianJazi | ....... | H04L 5/0053 |
| 2022/0330060 A1* | 10/2022 | Awadin | ................ | H04W 24/08 |
| 2022/0394548 A1* | 12/2022 | Huang | .................. | H04W 72/51 |
| 2023/0049784 A1* | 2/2023 | Lee | ........................ | H04W 72/23 |
| 2023/0217217 A1* | 7/2023 | Wu | ......................... | H04W 4/06 |
| | | | | 370/312 |

FOREIGN PATENT DOCUMENTS

| | | | |
|---|---|---|---|
| WO | WO-2022195885 A1 | * | 9/2022 |
| WO | WO-2022240984 A2 | * | 11/2022 |
| WO | WO-2023014152 A1 | * | 2/2023 |

* cited by examiner

TECHNIQUES FOR CONFIGURING TCI STATES FOR MBS TRANSMISSIONS

FIELD OF TECHNOLOGY

The following relates to wireless communications, including techniques for configuring transmission configuration indicator (TCI) states for multicast/broadcast services (MBS) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may broadcast to multiple devices. The wireless device may implement transmission configuration indicator (TCI) states. Conventional methods for such TCI schemes may be deficient.

SUMMARY

The described techniques relate to improved methods, systems, devices, and apparatuses that support techniques for configuring transmission configuration indicator (TCI) states for multicast/broadcast services (MBS) transmissions. Generally, the described techniques provide for improved approaches to the use of TCI states in multicast transmissions. A UE may receive signaling that may indicate a group of TCI states, which may include one or more TCI states associated with a first bandwidth part (BWP) and may further include one or more TCI states associated with a common frequency resource (CFR). The UE may further determine one or more TCI state lists, such as a first state list associated with the first BWP and a second state list associated with the CFR. The UE may further select a TCI state sharing scheme or a TCI state separation scheme. The TCI state sharing scheme may include or be associated with at least one TCI state that is common between a unicast transmission configuration and a multicast transmission configuration. As part of the sharing scheme, the separation scheme, or both, the UE may select one or more TCI states associated with a synchronization signal physical broadcast channel block, the first TCI state list, the second TCI state list, or a combination thereof. These selected TCI states may be associated with the unicast transmission configuration, the multicast transmission configuration, or both.

A method for wireless communications at a user equipment (UE) is described. The method may include receiving signaling indicating a group of transmission configuration indicator states, the group of transmission configuration indicator states including a first subset of transmission configuration indicator states associated with a first bandwidth part and a second subset of transmission configuration indicator states associated with a common frequency resource, determining, based on the group of transmission configuration indicator states, a transmission configuration indicator state list arrangement indicating a first state list associated with the first bandwidth part and a second state list associated with the common frequency resource, and selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

An apparatus for wireless communications at a UE is described. The apparatus may include a processor, memory coupled with the processor, and instructions stored in the memory. The instructions may be executable by the processor to cause the apparatus to receive signaling indicating a group of transmission configuration indicator states, the group of transmission configuration indicator states including a first subset of transmission configuration indicator states associated with a first bandwidth part and a second subset of transmission configuration indicator states associated with a common frequency resource, determine, based on the group of transmission configuration indicator states, a transmission configuration indicator state list arrangement indicating a first state list associated with the first bandwidth part and a second state list associated with the common frequency resource, and select, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

Another apparatus for wireless communications at a UE is described. The apparatus may include means for receiving signaling indicating a group of transmission configuration indicator states, the group of transmission configuration indicator states including a first subset of transmission configuration indicator states associated with a first bandwidth part and a second subset of transmission configuration indicator states associated with a common frequency resource, means for determining, based on the group of transmission configuration indicator states, a transmission configuration indicator state list arrangement indicating a first state list associated with the first bandwidth part and a second state list associated with the common frequency resource, and means for selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

A non-transitory computer-readable medium storing code for wireless communications at a UE is described. The code may include instructions executable by a processor to receive signaling indicating a group of transmission configuration indicator states, the group of transmission configuration indicator states including a first subset of transmission configuration indicator states associated with a first bandwidth part and a second subset of transmission configuration indicator states associated with a common frequency resource, determine, based on the group of transmission configuration indicator states, a transmission configuration indicator state list arrangement indicating a first state list associated with the first bandwidth part and a second state list associated with the common frequency resource, and select, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

Some examples of the method, apparatuses, and non-transitory computer-readable medium described herein may further include operations, features, means, or instructions for selecting the transmission configuration indicator state sharing scheme and selecting, as one or more transmission configuration indicator states associated with the multicast transmission configuration, one or more transmission configuration indicator states associated with a connected synchronization signal physical broadcast channel block.

Some examples of the method, apparatuses, and non-transitory computer-readable medium described herein may further include operations, features, means, or instructions for selecting the transmission configuration indicator state separation scheme, selecting, as one or more transmission configuration indicator states associated with the unicast transmission configuration, one or more transmission configuration indicator states associated with a connected synchronization signal physical broadcast channel block, and selecting, as one or more transmission configuration indicator states associated with the multicast transmission configuration, one or more transmission configuration indicator states associated with the second state list.

Some examples of the method, apparatuses, and non-transitory computer-readable medium described herein may further include operations, features, means, or instructions for selecting the transmission configuration indicator state sharing scheme and selecting, as one or more transmission configuration indicator states associated with the unicast transmission configuration and the multicast transmission configuration, one or more transmission configuration indicator states associated with the second state list.

Some examples of the method, apparatuses, and non-transitory computer-readable medium described herein may further include operations, features, means, or instructions for selecting the transmission configuration indicator state separation scheme, selecting, as one or more transmission configuration indicator states associated with the unicast transmission configuration, one or more transmission configuration indicator states associated with the first state list, and selecting, as one or more transmission configuration indicator states associated with the multicast transmission configuration, one or more transmission configuration indicator states associated with a connected synchronization signal physical broadcast channel block.

Some examples of the method, apparatuses, and non-transitory computer-readable medium described herein may further include operations, features, means, or instructions for selecting the transmission configuration indicator state sharing scheme and selecting, as one or more transmission configuration indicator states associated with the unicast transmission configuration and the multicast transmission configuration, one or more transmission configuration indicator states associated with the first state list.

Some examples of the method, apparatuses, and non-transitory computer-readable medium described herein may further include operations, features, means, or instructions for selecting the transmission configuration indicator state separation scheme, selecting, as one or more transmission configuration indicator states associated with the unicast transmission configuration, one or more transmission configuration indicator states associated with the first state list, and selecting, as one or more transmission configuration indicator states associated with the multicast transmission configuration, one or more transmission configuration indicator states associated with the second state list.

Some examples of the method, apparatuses, and non-transitory computer-readable medium described herein may further include operations, features, means, or instructions for selecting the transmission configuration indicator state sharing scheme, selecting, as one or more transmission configuration indicator states associated with the unicast transmission configuration, one or more transmission configuration indicator states associated with the first state list and one or more transmission configuration indicator states associated with the second state list, and selecting, as one or more transmission configuration indicator states associated with the multicast transmission configuration, one or more transmission configuration indicator states associated with the second state list.

Some examples of the method, apparatuses, and non-transitory computer-readable medium described herein may further include operations, features, means, or instructions for selecting the transmission configuration indicator state sharing scheme, selecting, as one or more transmission configuration indicator states associated with the unicast transmission configuration, one or more transmission configuration indicator states associated with the first state list, and selecting, as one or more transmission configuration indicator states associated with the multicast transmission configuration, one or more transmission configuration indicator states associated with the first state list and one or more transmission configuration indicator states associated with the second state list.

Some examples of the method, apparatuses, and non-transitory computer-readable medium described herein may further include operations, features, means, or instructions for selecting the transmission configuration indicator state sharing scheme and selecting, as one or more transmission configuration indicator states associated with the unicast transmission configuration and the multicast transmission configuration, one or more transmission configuration indicator states associated with the first state list and one or more transmission configuration indicator states associated with the second state list.

Some examples of the method, apparatuses, and non-transitory computer-readable medium described herein may further include operations, features, means, or instructions for receiving control signaling indicating that one or more transmission configuration indicator states of the first state list or the second state list may be to be included in the unicast transmission configuration, the multicast transmission configuration, or both.

Some examples of the method, apparatuses, and non-transitory computer-readable medium described herein may further include operations, features, means, or instructions for determining a default transmission configuration indicator state for a multicast transmission, a unicast transmission, or both, based on a control resource set identifier configured for a unicast transmission, a control resource set identifier configured for multicast transmission, or both.

In some examples of the method, apparatuses, and non-transitory computer-readable medium described herein, the first bandwidth part may be used to receive a unicast transmission and the common frequency resource may be confined within the first bandwidth part and used to receive a multicast transmission.

DETAILED DESCRIPTION

In wireless communications, a user equipment (UE) may receive multicast transmissions associated with a common frequency resource (CFR). The UE may also receive signaling that identifies configurations for transmission configuration indicator (TCI) states for the multicast transmissions. A UE may also receive unicast transmissions associated with a dedicated bandwidth part (BWP) and signaling indicating configurations for TCI states for the unicast transmissions. Conventional techniques are limited in that the behavior of the UE with these multiple TCI state configurations may not be defined. For example, a UE may receive signaling identifying only one configuration (e.g., for unicast or multicast), or may receive signaling identifying multiple configurations (e.g., for unicast and multicast). In these cases, there is no defined relationship between the various configurations, nor is there any defined behavior for the UE to manage these multiple TCI state configurations.

To improve the functioning of UEs in situations with multiple TCI state configurations (e.g., unicast and multicast transmissions), UE behavior may be defined. The UE may receive TCI states associated with a BWP (e.g., for unicast) and TCI states associated with a CFR (e.g., for multicast). The UE may determine an arrangement of TCI state lists (e.g., a first TCI state list for the BWP or unicast transmissions, or a second TCI state list for the CFR or multicast transmissions). The UE may select either a TCI state sharing scheme or a TCI state separation scheme. For example, the UE may utilize one or more TCI states from the first TCI state list originally associated with unicast transmissions for multicast transmissions, or vice versa. In some examples, the UE may utilize one or more TCI states associated with a synchronization signal physical broadcast channel block (SSB) for unicast transmissions, multicast transmissions, or both. The UE may utilize various combinations of TCI state lists for unicast transmissions, multicast transmissions, or both.

Aspects of the disclosure are initially described in the context of wireless communications systems. Aspects of the disclosure are then described in the context of example TCI state configurations and a process flow. Aspects of the disclosure are further illustrated by and described with reference to apparatus diagrams, system diagrams, and flowcharts that relate to techniques for configuring TCI states for MBS transmissions. It should be noted that aspects, elements, numbered elements, or other items discussed herein may be considered, though not necessarily so, to be examples of or related to other items bearing a similar name, even though they may be discussed in the context of different figures or may bear different reference numbers referring to aspects of the figures.

Figure 1:
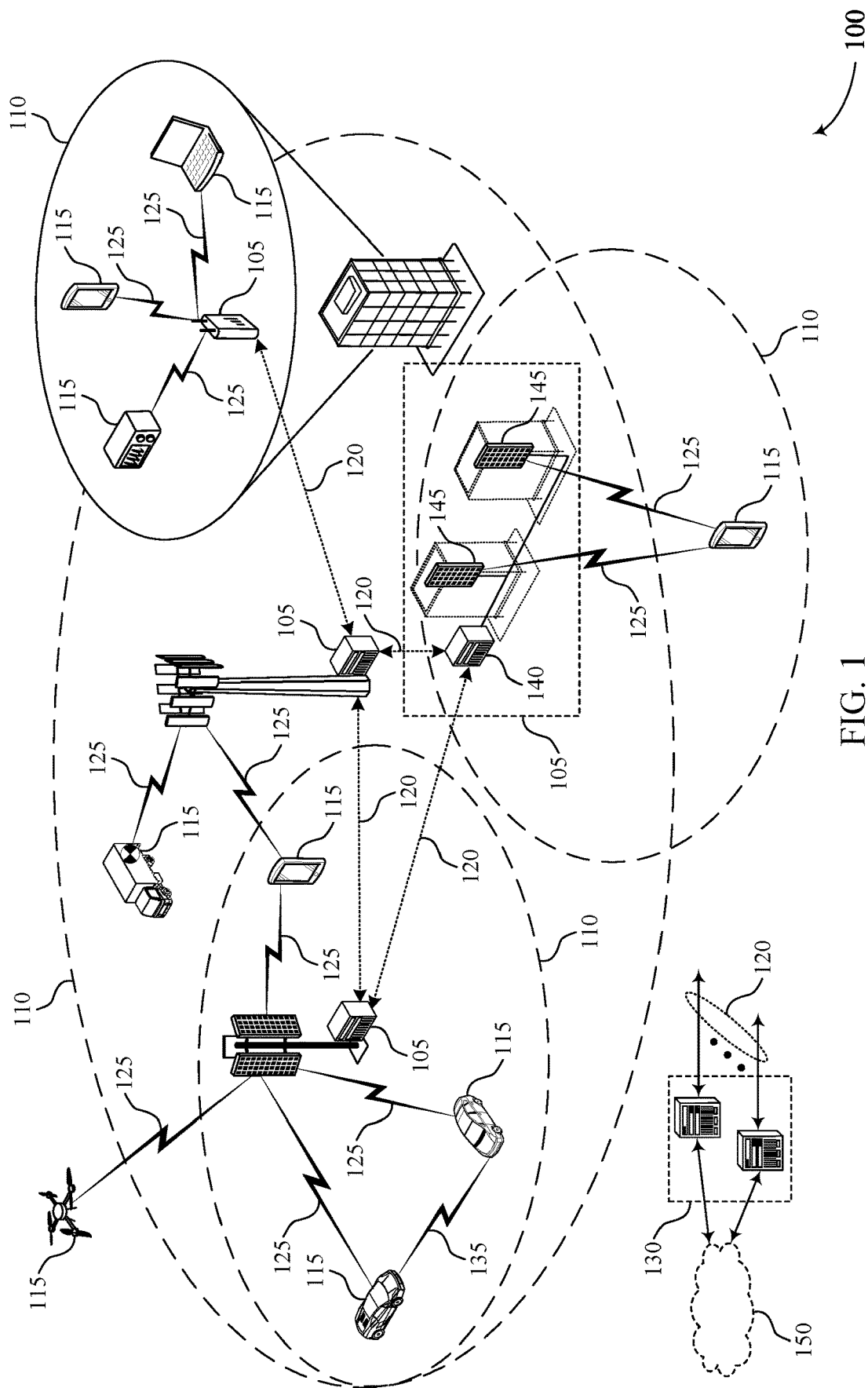
FIG. 1 illustrates an example of a wireless communications system that supports techniques for configuring transmission configuration indicator (TCI) states for multicast/broadcast services (MBS) transmissions.

FIG. 1 illustrates an example of a wireless communications system 100 that supports techniques for configuring TCI states for MBS transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE may engage in defined behavior associated with TCI state configurations, and, in some examples, may engage in such behavior in the context of multicast transmissions. The UE may receive one or more TCI states associated with a BWP, a CFR, or both. The UE may determine a first TCI state list, a second TCI state list, or both, based on the received TCI states. The UE may then select one or more TCI states from the first TCI state list, the second TCI state list, another source of possible TCI states (e.g., TCI states associated with an SSB), or a combination thereof for use in a unicast configuration, a multicast configuration, or both (in various combinations). The UE may further activate one or more TCI states. The UE may also determine one or more default TCI states for unicast, multicast, or both.

Figure 2:
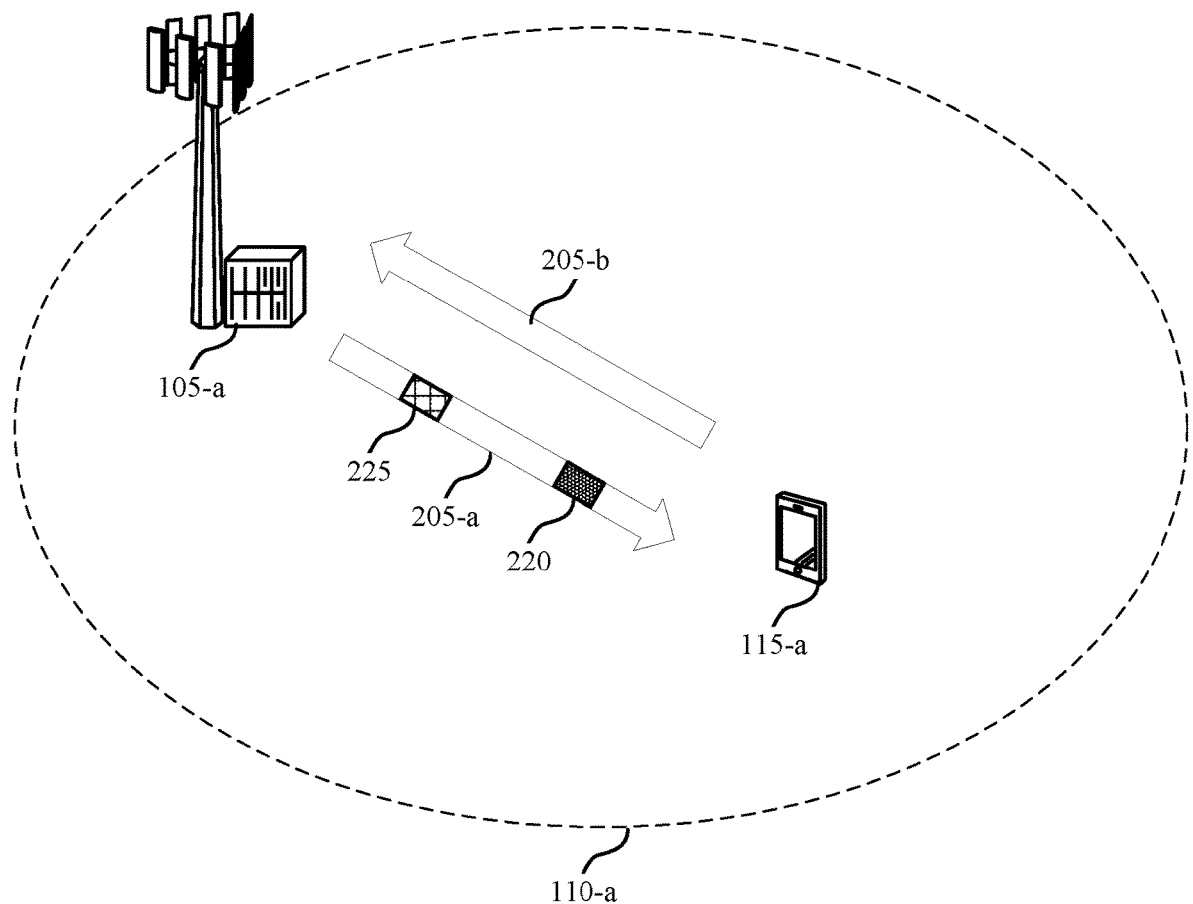
FIG. 2 illustrates an example of a system diagram that supports techniques for configuring TCI states for MBS transmissions in accordance with aspects of the present disclosure.

FIG. 2 illustrates an example of a system diagram 200 that supports techniques for configuring TCI states for MBS transmissions in accordance with aspects of the present disclosure. The wireless communications system 200 may include a base station 105-a that may be an example of the base station 105 discussed in relation to FIG. 1. The wireless communications system 200 may include UE 115-a that may be examples of the UE 115 discussed in relation to FIG. 1. In some examples, the base station 105-a and the UE 115 a may be located in a geographic coverage area 110-a. The base station 105-a may communicate with the UE 115-a via one or more downlink communication links 205-a and one or more uplink communication links 205-b In some examples, the UE 115-a may receive multicast services transmitted by another device (e.g., the base station 105-a or a network entity). In some examples, the UE may be connected via RRC, and may be considered an RRC_CONNECTED UE. In some examples, RRC_CONNECTED UEs may receive multicast services. In some such multicast services, a CFR may be defined, and the CFR may be defined for a group common (GC)-PDCCH, GC-PDSCH, or both. In some examples, the CFR may be one or more resources found within a BWP (e.g., a dedicated unicast BWP). In some examples, the CFR may be associated with or use the same numerology (e.g., subcarrier spacing (SCS) and cyclic prefix (CP)) as the BWP.

In some examples, a CFR may include or be associated with one or more configurations. For example, the CFR may include or be associated with a starting physical resource block (PRB), a number of PRBs, one or more physical downlink shared channel (PDSCH) configurations for multicast (e.g., separate from that of the dedicated unicast BWP), one or more physical downlink control channel (PDCCH) configurations for multicast (e.g., separate from that of the dedicated unicast BWP), one or more semi-persistent scheduling (SPS) configurations for multicast (e.g., separate from that of the dedicated unicast BWP), other configurations and details, or a combination thereof.

In some examples, one or more TCI states may be provided in a PDSCH configuration of a dedicated BWP (e.g., as a pool). In some examples, for PDSCH reception, one or multiple TCI states (e.g., up to 8 TCI states) may be activated by MAC-CE. One of the active TCI states may be determined by L1 and may be determined by downlink control information (DCI) or by a rule. In some examples, for PDCCH reception, one of the PDCCH TCI states may be activated by MAC-CE for one or more CORESETs. In some examples, the PDCCH TCI state list may be a subset of a PDSCH TCI state list.

In some examples, the UE 115-a may utilize a dedicated BWP that may have a PDCCH configuration and PDSCH configuration, and the UE 115-a may use one or both configurations for unicast transmissions. In some examples, a unicast approach may include one or more point-to-point (PTP) transmissions for unicast data, one or more PTP retransmissions for multicast, or both. In some examples, the UE 115-a may employ a unicast PDCCH with a radio network temporary identifier (RNTI), and the UE 115-a may be scheduled (e.g., by the base station 105-b or a network entity) to use a PDSCH with the same RNTI (e.g., a cell RNTI (C-RNTI), modulation and coding scheme RNTI (MCS-RNTI), configured scheduling RNTI (CS-RNTI), or a combination thereof).

In some examples, the UE 115-a may utilize a CFR. Such a CFR may include or be associated with its own one or more PDCCH configurations, one or more PDSCH configurations, or both, and such configurations may be used for multicast transmissions separately from unicast transmissions. In some examples, the UE 115-a may communicate via multicast, which may include one or more point-to-multipoint (PTM) transmissions for multicast transmission, retransmission, or both. The UE 115-a may communicate using a GC-PDCCH, and may further employ a group-common RNTI to schedule PDSCH with same RNTI (e.g., G-RNTI, G-CS-RNTI, or a combination thereof).

In some examples, a first TCI state list may include one or more TCI states configured in a PDSCH configuration associated with a dedicated BWP. In some examples, a second TCI state list may include one or more TCI states configured in a PDSCH configuration of a CFR associated with the dedicated BWP (e.g., the CFR may be confined within the dedicated BWP using same SCS and CP).

In some examples, the UE 115-a UE may receive signaling 220 (e.g., from the base station 105-a) that may indicate a group of TCI states, which may include one or more TCI states associated with a BWP and may further include one or more TCI states associated with a CFR. The UE 115-a may determine one or more TCI state lists, such as a first state list associated with the first BWP and a second state list associated with the CFR. The UE may further select a TCI state sharing scheme or a TCI state separation scheme. The TCI state sharing scheme may include or be associated with at least one TCI state that is common between a unicast transmission configuration and a multicast transmission configuration. As part of the sharing scheme, the separation scheme, or both, the UE may select one or more TCI states associated with a synchronization signal physical broadcast channel block, the first TCI state list, the second TCI state list, or a combination thereof. In some examples, the selected TCI states may be associated with the unicast transmission configuration, the multicast transmission configuration, or both.

In some examples, the UE 115-a may receive control signaling 225. In some examples, the control signaling 225 may indicate one or more TCI states (e.g., TCI states associated with the first TCI state list, the second TCI state list, or both) are to be included in the unicast transmission configuration, the multicast transmission configuration, or both. In some examples, the signaling 220 and the control signaling 225 may be a single signaling transmission (e.g., the signaling 220 and the control signaling 225 may be combined in a single transmission, such as a DCI transmission). In some examples, the signaling 220 and the control signaling 225 may be received as separate transmissions (e.g., separate DCI, MAC-CE, or other transmissions).

In some examples, the UE 115-a may determine one or more default TCI states for unicast transmissions, multicast transmissions, or both. In some examples, the UE 115-a may determine the one or more default TCI states based on a CORESET identifier configured for a unicast transmission, a multicast transmission, or both. For example, for a unicast transmission, the UE 115-a may determine a default TCI state based on a CORESET identifier configured for a unicast transmission. Similarly, for a multicast transmission, the UE 115-a may determine a default TCI state based on a CORESET identifier configured for a multicast transmission.

In some examples, a default TCI state (e.g., for unicast transmissions), may be defined as a PDCCH TCI state with an identifier (e.g., a controlResourceSetId) lowest among one or more CORESETs configured in a PDCCH configuration of a BWP (e.g., a dedicated BWP).

In some examples, for unicast, multicast, or both, the UE 115-a may support different default TCI states, which may be subject to one or more capabilities of the UE 115-a.

For example, a default TCI state for a unicast PDCCH may be defined. Such a default state for unicast transmissions may be defined as a PDCCH TCI state with an identifier (e.g., a controlResourceSetId) lowest among one or more CORESETs for unicast. If the UE 115-a is not sharing TCI states between a unicast configuration and a multicast configuration (or between a first TCI state list and a second TCI state list), one or more CORESETs for unicast may include those TCI states configured in a PDCCH configuration of a BWP. In some such examples, the one or more CORESETs may not include those TCI states configured in a PDCCH configuration of a CFR. However, if the UE 115-a is sharing TCI states (e.g., between a unicast configuration and a multicast configuration or between a first TCI state list and a second TCI state list), one or more CORESETs in a BWP may include those TCI states configured in the PDCCH configuration the dedicated BWP and those TCI states configured in in the PDCCH configuration of the CFR.

Similarly, a default TCI state for a multicast GC-PDCCH may be defined. In some examples, the such a default TCI state for a multicast GC-PDCCH may be a PDCCH TCI state with a lowest identifier (e.g., a controlResourceSetId) among one or more CORESETs for multicast transmissions. If the UE 115-a is not sharing TCI states between a unicast configuration and a multicast configuration (or between a first TCI state list and a second TCI state list), one or more CORESETs for multicast may include those TCI states configured in a PDCCH configuration of a CFR. In some such examples, the one or more CORESETs may not include those TCI states configured in a PDCCH configuration of a BWP. However, if the UE 115-*a* is sharing TCI states (e.g., between a unicast configuration and a multicast configuration or between a first TCI state list and a second TCI state list), one or more CORESETs in a CFR may include those TCI states configured in the PDCCH configuration of the CFR and those TCI states configured in in the PDCCH configuration of the dedicated BWP.

In some examples, the UE 115-*a* may activate one or more TCI states (e.g., one or more TCI states selected for the unicast transmission configuration, the multicast transmission configuration, or both). The UE 115-*a* may activate the one or more TCI states with a MAC-CE or with other approaches.

Figure 3:
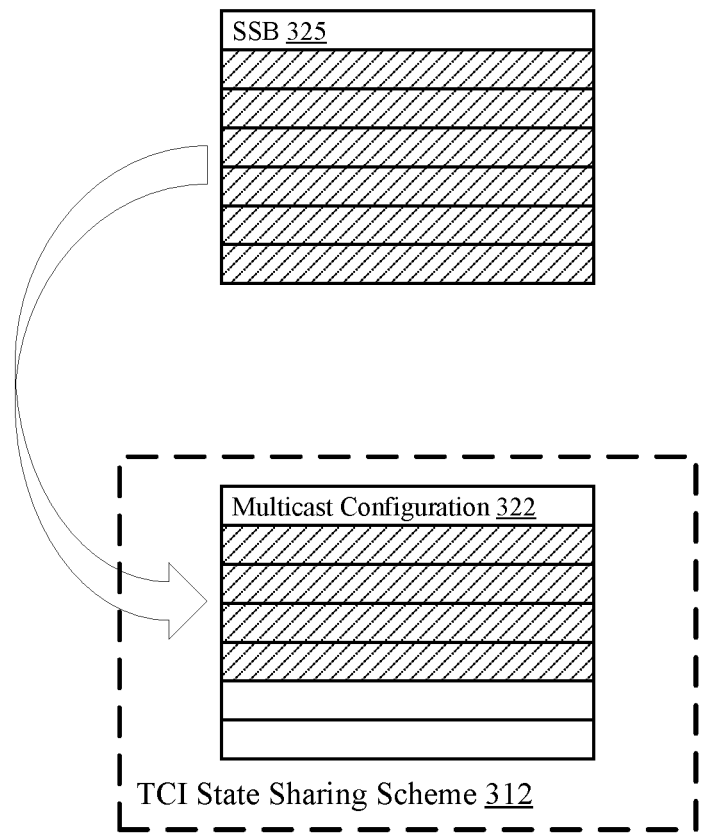
FIG. 3 illustrates an example of a TCI state configuration that supports techniques for configuring TCI states for MBS transmissions in accordance with aspects of the present disclosure.

FIG. 3 illustrates an example of a TCI state configuration 300 that supports techniques for configuring TCI states for MBS transmissions in accordance with aspects of the present disclosure. The TCI state configuration 300 may include a TCI state sharing scheme 312, which may include a multicast configuration 322. The TCI state configuration 300 may also include an SSB 325, which may be associated with one or more SSB TCI states 330. Discussions of the UE 115 and other UEs throughout may also be understood to apply to the UE discussed in relation to FIG. 3.

In some examples, the UE may employ the TCI state sharing scheme 312. The UE may use one or more of the SSB TCI states 330 as one or more TCI states in the multicast configuration 322. For example, the UE may utilize one or more TCI states of an SSB (e.g., a connected SSB). For example, one or more demodulation reference signal (DMRS) ports of the PDCCH (e.g., the GC-PDCCH), the PDSCH (e.g., the GC-PDCCH), or both may be quasi co-located with a PDCCH of the SSB, a PDSCH of the SSB, or both. As such, the UE may employ a multicast configuration 322 that includes one or more TCI states for improved TCI state configuration for multicast transmissions.

Figure 4:
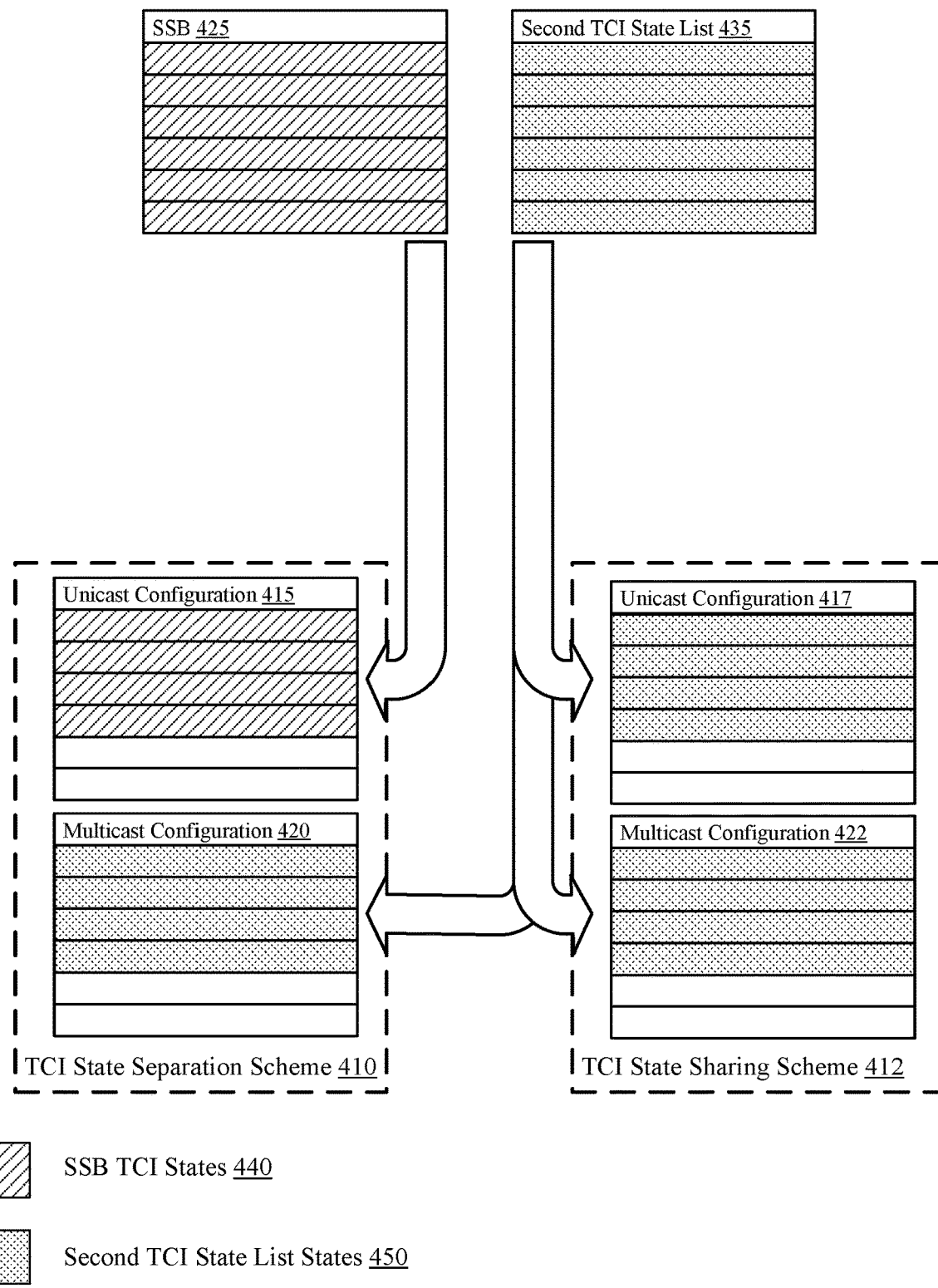
FIG. 4 illustrates an example of a TCI state configuration that supports techniques for configuring TCI states for MBS transmissions in accordance with aspects of the present disclosure.

FIG. 4 illustrates an example of a TCI state configuration 400 that supports techniques for configuring TCI states for MBS transmissions in accordance with aspects of the present disclosure. The TCI state configuration 400 may include a TCI state separation scheme 410, which may include a unicast configuration 415 and a multicast configuration 420. The TCI state configuration 400 may include a TCI state sharing scheme 412, which may include a unicast configuration 417 and a multicast configuration 422. The TCI state configuration 400 may also include an SSB 425, which may be associated with one or more SSB TCI states 440, as well as a second TCI state list 435, which may be associated with one or more second TCI state list states 450, a CFR, or both. The second TCI state list 435 may include one or more TCI states configured in a PDSCH configuration of a CFR associated with a dedicated BWP (e.g., the CFR may be confined within the dedicated BWP using the same SCS and CP). Discussions of the UE 115 and other UEs throughout may also be understood to apply to the UE discussed in relation to FIG. 4.

In some examples, the UE may not share any TCI states between a unicast configuration and a multicast configuration. For example, the UE may employ the TCI state separation scheme 410. In such an approach, the UE may utilize one or more SSB TCI states 440 as TCI states for the unicast configuration 415. Additionally or alternatively, the UE may utilize one or more second TCI state list states 450 as TCI states for the multicast configuration 420. In some examples, the one or more second TCI state list states 450 may be used for a GC-PDCCH, a GC-PDSCH, or both. In some examples, the UE may employ the TCI states for the multicast configuration 420 independently from the TCI states employed for the unicast configuration 415. In some examples, one or more active TCI states may be indicated by a DCI transmission. The DCI transmission may include a DCI of a DCI format that may include a group RNTI (G-RNTI) that may schedule a multicast GC-PDSCH reception.

In some examples, the UE may share one or more TCI states between a unicast configuration and a multicast configuration. For example, the UE may employ the TCI state sharing scheme 412. In such an approach, a TCI state list configured for the CFR (e.g., the second TCI state list 435) may be employed to provide one or more TCI states for both the unicast configuration 417 and the multicast configuration 422. In some examples, the common TCI states may be used for both unicast transmissions and multicast transmissions in the same dedicated BWP (e.g., the CFR associated with the multicast transmissions may be contained within the BWP associated with the unicast transmissions).

In some examples, the active TCI states for a unicast PDSCH may also be the active TCI states for the multicast GC-PDSCH. In some examples, the UE may receive a DCI of a DCI format that may include a G-RNTI may contain a TCI state field may have the same bitwidth and codepoints as such a field in a in unicast DCI format (e.g., DCI format 1_1/1_2 with C-RNTI, MCS-C-RNTI, CS-RNTI, or a combination thereof). In some examples, the UE may receive a DCI of a DCI format that may include a G-RNTI or G-CS-RNTI. The DCI may schedule a multicast GC-PDSCH reception. In some examples, one or more dynamically indicated TCI states may be different for unicast and multicast or may be the same.

Figure 5:
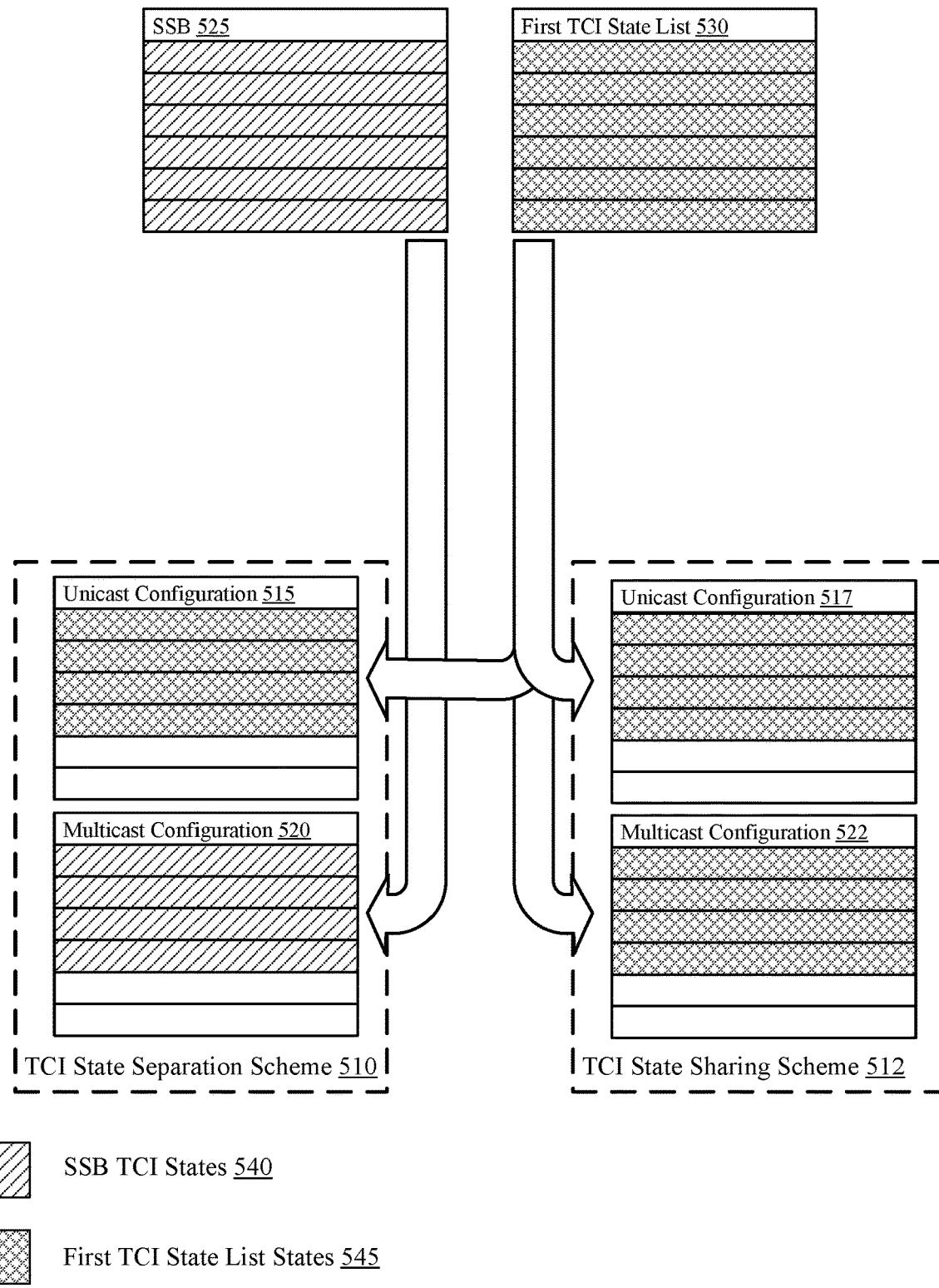
FIG. 5 illustrates an example of a TCI state configuration that supports techniques for configuring TCI states for MBS transmissions in accordance with aspects of the present disclosure.

As such, the UE may employ a unicast configuration 415, a unicast configuration 417, a multicast configuration 420, and a multicast configuration 422 that include one or more TCI states for improved TCI state configuration for multicast transmissions FIG. 5 illustrates an example of a TCI state configuration 500 that supports techniques for configuring TCI states for MBS transmissions in accordance with aspects of the present disclosure. The TCI state configuration 500 may include a TCI state separation scheme 510, which may include a unicast configuration 515 and a multicast configuration 520. The TCI state configuration 500 may include a TCI state sharing scheme 512, which may include a unicast configuration 517 and a multicast configuration 522. The TCI state configuration 500 may also include an SSB 525, which may be associated with one or more SSB TCI states 540, as well as a first TCI state list 530, which may be associated with a one or more first TCI state list states 545, a BWP, or both. The first TCI state list 530 may include one or more TCI states configured in a PDSCH configuration of a dedicated BWP. Discussions of the UE 115 and other UEs throughout may also be understood to apply to the UE discussed in relation to FIG. 5.

In some examples, the UE may not share any TCI states between a unicast configuration and a multicast configuration. For example, the UE may employ the TCI state separation scheme 510. In such an approach, the UE may utilize one or more first TCI state list states 545 as TCI states for the unicast configuration 515. The TCI states used in the unicast configuration 515 may include one or more TCI states configured in a dedicated BWP. Additionally or alternatively, the UE may utilize one or more SSB TCI states 540 as TCI states for the multicast configuration 520.

In some examples, the UE may share one or more TCI states between a unicast configuration and a multicast configuration. For example, the UE may employ the TCI state sharing scheme 512. In such an approach, a TCI state list configured for the BWP (e.g., the first TCI state list 530) may be employed to provide one or more TCI states for both the unicast configuration 517 and the multicast configuration 522. In some examples, TCI states (e.g., the first TCI state list states 545) may be used for both unicast transmissions and multicast transmissions in the same dedicated BWP (e.g., the CFR associated with the multicast transmissions may be contained within the BWP associated with the unicast transmissions).

In some examples, the active TCI states for a multicast GC-PDSCH may also be the active TCI states for the unicast PDSCH. In some examples, the UE may receive a DCI of a DCI format that may include a G-RNTI may contain a TCI state field may have the same bitwidth and codepoints as such a field in a in unicast DCI format (e.g., DCI format 1_1/1_2 with C-RNTI, MCS-C-RNTI, CS-RNTI, or a combination thereof). In some examples, the UE may receive a DCI of a DCI format that may include a G-RNTI. The DCI may schedule a multicast GC-PDSCH reception. In some examples, one or more dynamically indicated TCI states may be different for unicast and multicast or may be the same.

Additionally or alternatively, the UE may receive signaling (e.g., signaling 220, control signaling 225, RRC signaling, MAC-CE signaling, or a combination thereof) that may configure the UE to utilize the one or more TCI states in the first TCI state list 530 for unicast transmissions, multicast transmissions, or both. In some examples, a MAC-CE may activate the first TCI state list states 545, the TCI states employed in the unicast configuration 517, the TCI states employed in the multicast configuration 522, or a combination thereof. For the unicast configuration 517, a MAC-CE may activate such TCI states in a unicast PDSCH. For the multicast configuration 522, a MAC-CE may activate such TCI states in a multicast GC-PDSCH.

Figure 6:
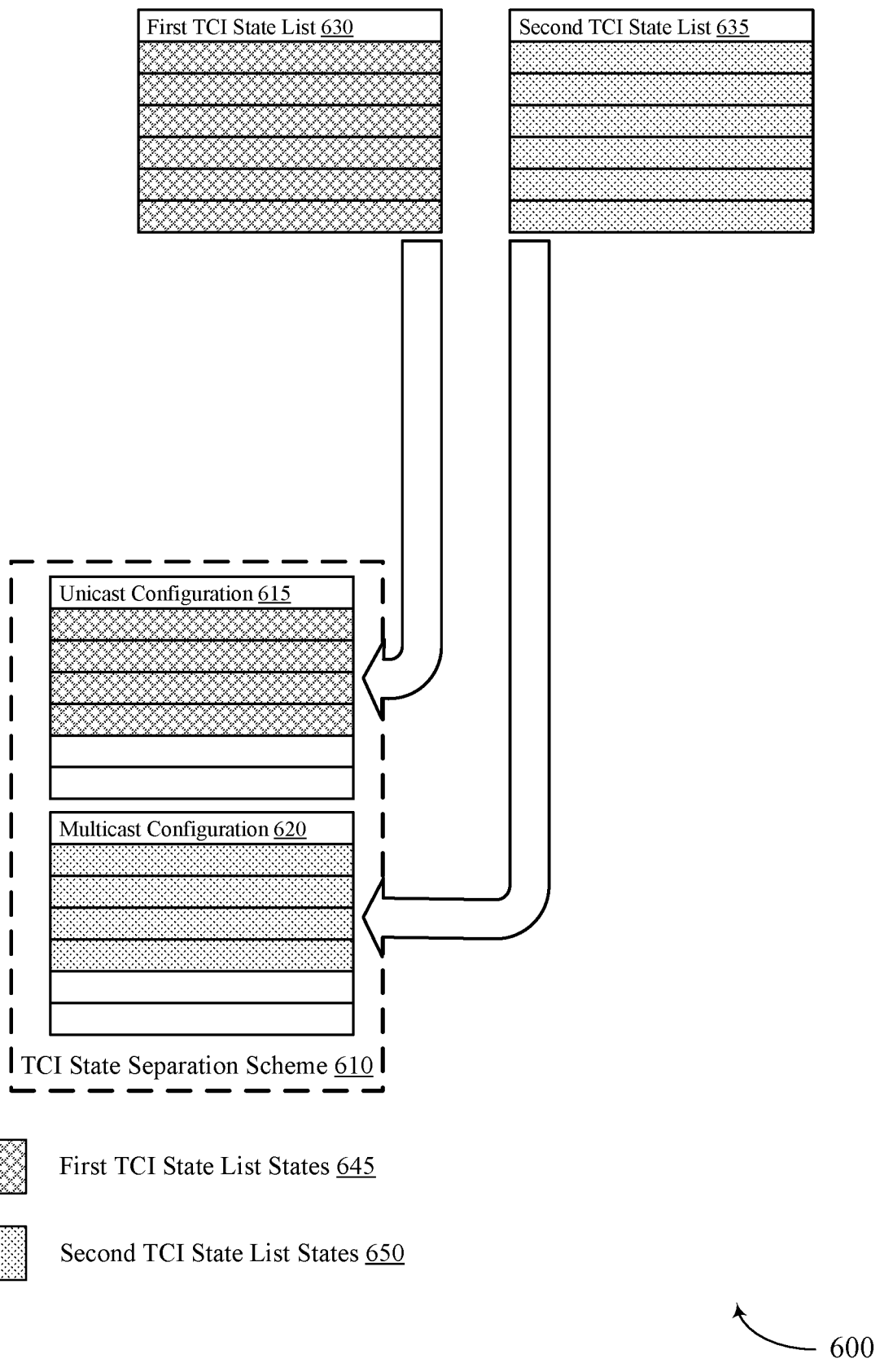
FIG. 6 illustrates an example of a TCI state configuration that supports techniques for configuring TCI states for MBS transmissions in accordance with aspects of the present disclosure.

As such, the UE may employ a unicast configuration 515, a unicast configuration 517, a multicast configuration 520, and a multicast configuration 522 that include one or more TCI states for improved TCI state configuration for multicast transmissions FIG. 6 illustrates an example of a TCI state configuration 600 that supports techniques for configuring TCI states for MBS transmissions in accordance with aspects of the present disclosure. The TCI state configuration 600 may include a TCI state separation scheme 610, which may include a unicast configuration 615 and a multicast configuration 620. The TCI state configuration 600 may include a first TCI state list 630, which may be associated with a one or more first TCI state list states 645, a BWP, or both. The TCI state configuration 600 may include a second TCI state list 635, which may be associated with a one or more first TCI state list states 645, a CFR, or both. Discussions of the UE 115 and other UEs throughout may also be understood to apply to the UE discussed in relation to FIG. 6.

In some examples, the UE may not share any TCI states between a unicast configuration and a multicast configuration. For example, the UE may employ the TCI state separation scheme 610. In such an approach, the UE may utilize one or more first TCI state list states 645 as TCI states for the unicast configuration 615. The TCI states used in the unicast configuration 615 may include one or more TCI states configured in a dedicated BWP. In some examples, a MAC-CE may activate one or more TCI states in the first TCI state list 630, one or more TCI states associated with the unicast configuration 615, or both. The UE may include such activated states in a unicast PDSCH. Additionally or alternatively, the MAC may include a field that may indicate whether the MAC-CE may activate a TCI state for unicast or for multicast. In some examples, a TCI state field in a DCI of a DCI format (e.g., a DCI format 1_1/1_2 with C-RNTI, MCS-C-RNTI, CS-RNTI, or a combination thereof), including a bitwidth, codepoints, or both, may be based on one or more MAC-CE activated TCI states for unicast.

Additionally or alternatively, the UE may utilize one or more second TCI state list states 650 as TCI states for the multicast configuration 620. The TCI states used in the multicast configuration 620 may include one or more TCI states configured in a CFR. In some examples, a MAC-CE may activate one or more TCI states in the second TCI state list 635, one or more TCI states associated with the multicast configuration 620, or both. The UE may include such activated states in a multicast GC-PDSCH. Additionally or alternatively, the MAC may include a field that may indicate whether the MAC-CE may activate a TCI state for unicast or for multicast. In some examples, a TCI state field in a DCI of a DCI format (e.g., a DCI format 1_1/1_2 with group RNTI (G-RNTI), group CS-RNTI (G-CS-RNTI), or a combination thereof), including a bitwidth, codepoints, or both, may be based on the second TCI state list 635.

As such, the UE may employ a unicast configuration 615 and a multicast configuration 620 in a TCI state separation scheme 610 that may include one or more TCI states for improved TCI state configuration for multicast transmissions.

Figure 7:
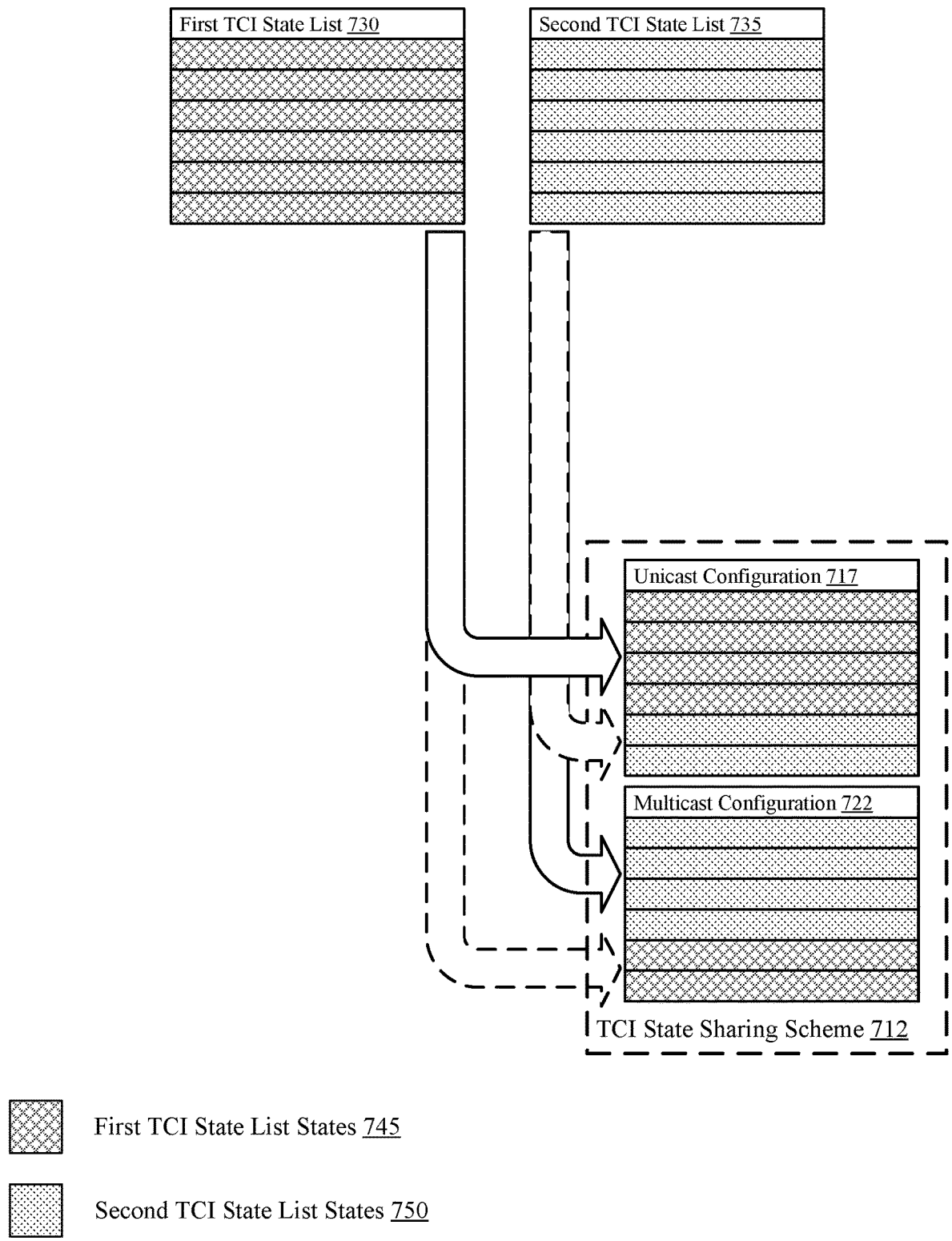
FIG. 7 illustrates an example of a TCI state configuration that supports techniques for configuring TCI states for MBS transmissions in accordance with aspects of the present disclosure.

FIG. 7 illustrates an example of a TCI state configuration 700 that supports techniques for configuring TCI states for MBS transmissions in accordance with aspects of the present disclosure. The TCI state configuration 700 may include a TCI state sharing scheme 712, which may include a unicast configuration 717 and a multicast configuration 722. The TCI state configuration 700 may include a first TCI state list 730, which may be associated with a one or more first TCI state list states 745, a BWP, or both. The TCI state configuration 700 may include a second TCI state list 735, which may be associated with a one or more first TCI state list states 745, a CFR, or both. Discussions of the UE 115 and other UEs throughout may also be understood to apply to the UE discussed in relation to FIG. 6.

In some examples, a UE may share one or more TCI states between a unicast configuration and a multicast configuration. For example, the UE may employ a TCI state sharing scheme 712. In some examples, the UE may utilize one or more TCI states from the first TCI state list 730 (e.g., the first TCI state list states 745) and the second TCI state list 735 (e.g., the second TCI state list states 750) to be used in the unicast configuration 717. In some examples, a MAC-CE may activate one or more TCI states in the first TCI state list 730, the second TCI state list 735, one or more TCI states associated with the unicast configuration 717, or a combination thereof, in a unicast PDSCH.

Additionally or alternatively, UE may utilize one or more TCI states from the second TCI state list 735 (e.g., the second TCI state list states 750) to be used in the multicast configuration 722. In some examples, a MAC-CE may activate one or more TCI states in the second TCI state list 735, one or more TCI states associated with the multicast configuration 722, or a combination thereof, in a multicast GC-PDSCH. Additionally or alternatively, the MAC-CE may include a field that may indicate whether the MAC-CE may activate one or more TCI states for unicast, multicast, or both.

In some examples, the UE may utilize one or more TCI states from the first TCI state list 730 (e.g., the first TCI state list states 745) to be used in the unicast configuration 717. In some examples, a MAC-CE may activate one or more TCI states in the first TCI state list 730, one or more TCI states associated with the unicast configuration 717, or both, in a unicast PDSCH.

Additionally or alternatively, UE may utilize one or more TCI states from the first TCI state list 730 (e.g., the first TCI state list states 745) and the second TCI state list 735 (e.g., the second TCI state list states 750) to be used in the multicast configuration 722. In some examples, such TCI states may be used for both unicast and multicast transmissions in the same BWP (e.g., the CFR associated with the second TCI state list 735 may be contained within the BWP with which the first TCI state list 730 may be associated). In some examples, a MAC-CE may activate one or more TCI states in the first TCI state list 730, the second TCI state list 735, one or more TCI states associated with the multicast configuration 722, or a combination thereof, in a multicast GC-PDSCH. Additionally or alternatively, the MAC-CE may include a field that may indicate whether the MAC-CE may activate one or more TCI states for unicast, multicast, or both.

In some examples, the UE may utilize one or more TCI states from the first TCI state list 730 (e.g., the first TCI state list states 745) and the second TCI state list 735 (e.g., the second TCI state list states 750) to be used in the unicast configuration 717 and the multicast configuration 722. In some examples, such TCI states may be used for both unicast and multicast transmissions in the same BWP (e.g., the CFR associated with the second TCI state list 735 may be contained within the BWP with which the first TCI state list 730 may be associated). In some examples, a MAC-CE may activate one or more TCI states in the first TCI state list 730, the second TCI state list 735, one or more TCI states associated with the unicast configuration 717, one or more TCI states associated with the multicast configuration 722, or a combination thereof, in a unicast PDSCH, a multicast GC-PDSCH, or a combination thereof. In some examples, the active TCI states for a unicast PDSCH may also be the active TCI states for a multicast GC-PDSCH. In some examples, the UE may receive a DCI of a DCI format that may include a G-RNTI may contain a TCI state field may have the same bitwidth and codepoints as such a field in a in unicast DCI format (e.g., DCI format 1_1/1_2 with C-RNTI, MCS-C-RNTI, CS-RNTI, or a combination thereof).

Additionally or alternatively, the UE may receive signaling (e.g., signaling 220, control signaling 225, RRC signaling, MAC-CE signaling, or a combination thereof) that may configure the UE to utilize the one or more TCI states in the first TCI state list 730, the second TCI state list 735, or both, for unicast transmissions, multicast transmissions, or both. In some examples, a MAC-CE may activate the first TCI state list states 745, the second TCI state list states 750, the TCI states employed in the unicast configuration 717, the TCI states employed in the multicast configuration 722, or a combination thereof. For the unicast configuration 717, a MAC-CE may activate such TCI states in a unicast PDSCH. For the multicast configuration 722, a MAC-CE may activate such TCI states in a multicast GC-PDSCH.

As such, the UE may employ a unicast configuration 717 and a multicast configuration 722 in a TCI state sharing scheme 712 that includes one or more TCI states for improved TCI state configuration for multicast transmissions.

Figure 8:
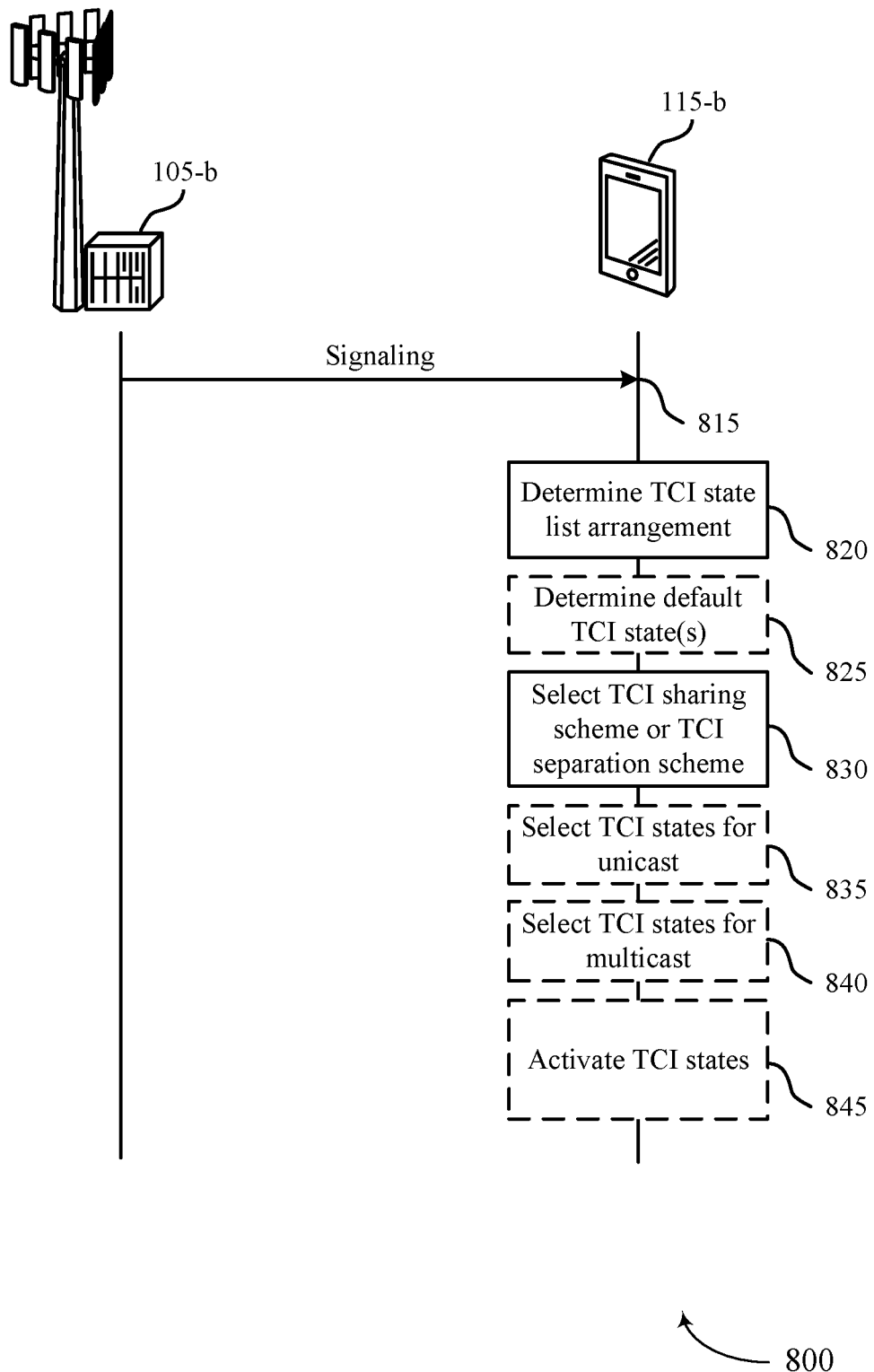
FIG. 8 illustrates an example of a process flow that supports techniques for configuring TCI states for MBS transmissions in accordance with aspects of the present disclosure.

FIG. 8 illustrates an example of a process flow 800 that supports techniques for configuring TCI states for MBS transmissions in accordance with aspects of the present disclosure. FIG. 8 illustrates an example of a process flow 800 that supports sidelink channel access timeline techniques for wireless communications systems in accordance with one or more aspects of the present disclosure. The process flow 800 may implement various aspects of the present disclosure described with reference to FIGS. 1-7. The process flow 800 may include a UE 115-*b* and a base station 105-*b*, which may be examples of UE 115 and base station 105 as described with reference to FIGS. 1-7. In some examples, the UE 115-*b* may be configured with a one or more parameters for configuring TCI states for multicast transmissions.

In the following description of the process flow 800, the operations between the UE 115-*b* and the base station 105-*b* may be performed in different orders or at different times. Some operations may also be left out of the process flow 800, or other operations may be added. Although the UE 115-*b* and the base station 105-*b* are shown performing the operations of the process flow 800, some aspects of some operations may also be performed by one or more other wireless devices.

At 815, the UE 115-*b* may receive signaling indicating a group of transmission configuration indicator states. The group of transmission configuration indicator states may include a first subset of transmission configuration indicator states associated with a first bandwidth part and a second subset of transmission configuration indicator states associated with a common frequency resource. In some examples, the UE 115-*b* may receive control signaling indicating that one or more transmission configuration indicator states of the first state list or the second state list are to be included in the unicast transmission configuration, the multicast transmission configuration, or both. In some examples, the first bandwidth part may be used to receive a unicast transmission and the common frequency resource may be confined within the first bandwidth part and used to receive a multicast transmission At 820, the UE 115-*b* may determine, based on the group of transmission configuration indicator states, a transmission configuration indicator state list arrangement indicating a first state list associated with the first bandwidth part and a second state list associated with the common frequency resource.

At 825, the UE 115-*b* may determine one or more default TCI states. In some examples, the UE 115-*b* may determine a default transmission configuration indicator state for a multicast transmission based at least in part on a control resource set identifier configured for a multicast transmission. In some examples, the UE 115-*b* may determine a default transmission configuration indicator state for a unicast transmission based at least in part on a control resource set identifier configured for a unicast transmission or a multicast transmission.

At 830, the UE 115-*b* may select, based at least in part on the transmission configuration indicator state list arrangement, a transmission configuration indicator state sharing scheme or a transmission configuration indicator state separation scheme. The transmission configuration indicator state sharing scheme may include at least one transmission configuration indicator state that may be common between a unicast transmission configuration and a multicast transmission configuration.

At 835, the UE 115-*b* may select one or more TCI states for use in connection with unicast transmissions. In some examples, the UE 115-*b* may select, as one or more transmission configuration indicator states associated with the unicast transmission configuration, one or more transmission configuration indicator states associated with a connected synchronization signal physical broadcast channel block. In some examples, the UE 115-b may select, as one or more transmission configuration indicator states associated with the unicast transmission configuration and the multicast transmission configuration, one or more transmission configuration indicator states associated with the second state list. In some examples, the UE 115-b may select, as one or more transmission configuration indicator states associated with the unicast transmission configuration, one or more transmission configuration indicator states associated with the first state list. In some examples, the UE 115-b may select, as one or more transmission configuration indicator states associated with the unicast transmission configuration and the multicast transmission configuration, one or more transmission configuration indicator states associated with the first state list. In some examples, the UE 115-b may select, as one or more transmission configuration indicator states associated with the unicast transmission configuration, one or more transmission configuration indicator states associated with the first state list. In some examples, the UE 115-b may select, as one or more transmission configuration indicator states associated with the unicast transmission configuration, one or more transmission configuration indicator states associated with the first state list and one or more transmission configuration indicator states associated with the second state list. In some examples, the UE 115-b may select, as one or more transmission configuration indicator states associated with the unicast transmission configuration, one or more transmission configuration indicator states associated with the first state list. In some examples, the UE 115-b may select, as one or more transmission configuration indicator states associated with the unicast transmission configuration and the multicast transmission configuration, one or more transmission configuration indicator states associated with the first state list and one or more transmission configuration indicator states associated with the second state list.

At 840, the UE 115-b may select one or more TCI states for use in connection with multicast transmissions. In some examples, the UE 115-b may select, as one or more transmission configuration indicator states associated with the multicast transmission configuration, one or more transmission configuration indicator states associated with a connected synchronization signal physical broadcast channel block. In some examples, the UE 115-b may select, as one or more transmission configuration indicator states associated with the multicast transmission configuration, one or more transmission configuration indicator states associated with the second state list. In some examples, the UE 115-b may select, as one or more transmission configuration indicator states associated with the unicast transmission configuration and the multicast transmission configuration, one or more transmission configuration indicator states associated with the second state list. In some examples, the UE 115-b may select, as one or more transmission configuration indicator states associated with the multicast transmission configuration, one or more transmission configuration indicator states associated with a connected synchronization signal physical broadcast channel block. In some examples, the UE 115-b may select, as one or more transmission configuration indicator states associated with the unicast transmission configuration and the multicast transmission configuration, one or more transmission configuration indicator states associated with the first state list In some examples, the UE 115-b may select, as one or more transmission configuration indicator states associated with the multicast transmission configuration, one or more transmission configuration indicator states associated with the second state list. In some examples, the UE 115-b may select, as one or more transmission configuration indicator states associated with the multicast transmission configuration, one or more transmission configuration indicator states associated with the second state list. In some examples, the UE 115-b may select, as one or more transmission configuration indicator states associated with the multicast transmission configuration, one or more transmission configuration indicator states associated with the first state list and one or more transmission configuration indicator states associated with the second state list. In some examples, the UE 115-b may select, as one or more transmission configuration indicator states associated with the unicast transmission configuration and the multicast transmission configuration, one or more transmission configuration indicator states associated with the first state list and one or more transmission configuration indicator states associated with the second state list.

At 845, the UE 115-b may activate, with a medium access control control element, one or more transmission configuration indicator states of the first state list, the second state list, or both.

Figure 9:
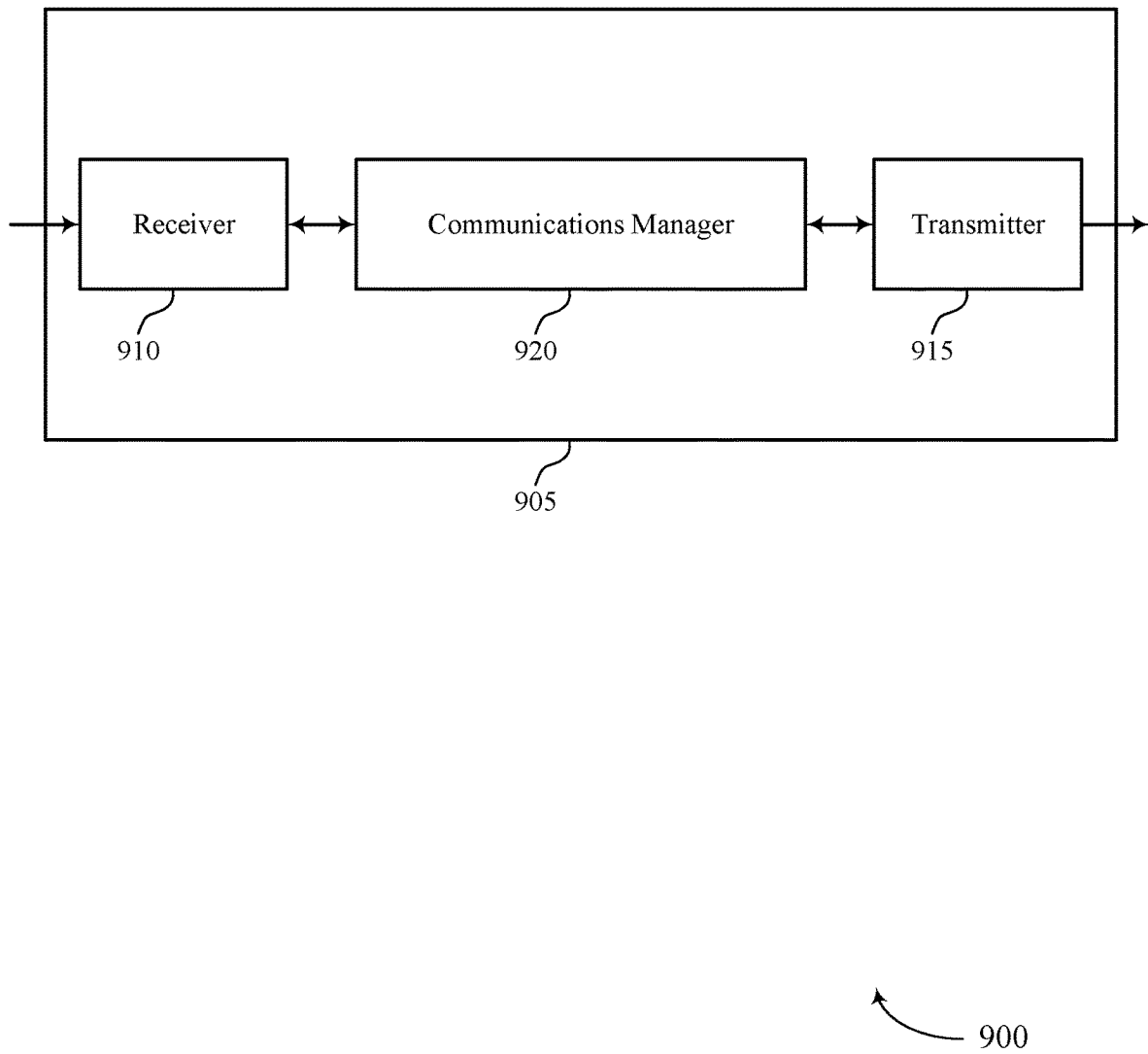
FIGS. 9 and 10 show block diagrams of devices that support techniques for configuring TCI states for MBS transmissions in accordance with aspects of the present disclosure.

FIG. 9 shows a block diagram 900 of a device 905 that supports techniques for configuring TCI states for MBS transmissions in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for configuring TCI states for MBS transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for configuring TCI states for MBS transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for configuring TCI states for MBS transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

Additionally or alternatively, the communications manager 920 may support wireless communications at a UE in accordance with examples as disclosed herein. For example, the communications manager 920 may be configured as or otherwise support a means for receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The communications manager 920 may be configured as or otherwise support a means for determining, based on the group of transmission configuration indicator states, a transmission configuration indicator state list arrangement indicating a first state list associated with the first bandwidth part and a second state list associated with the common frequency resource. The communications manager 920 may be configured as or otherwise support a means for selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources, or a combination thereof.

Figure 10:
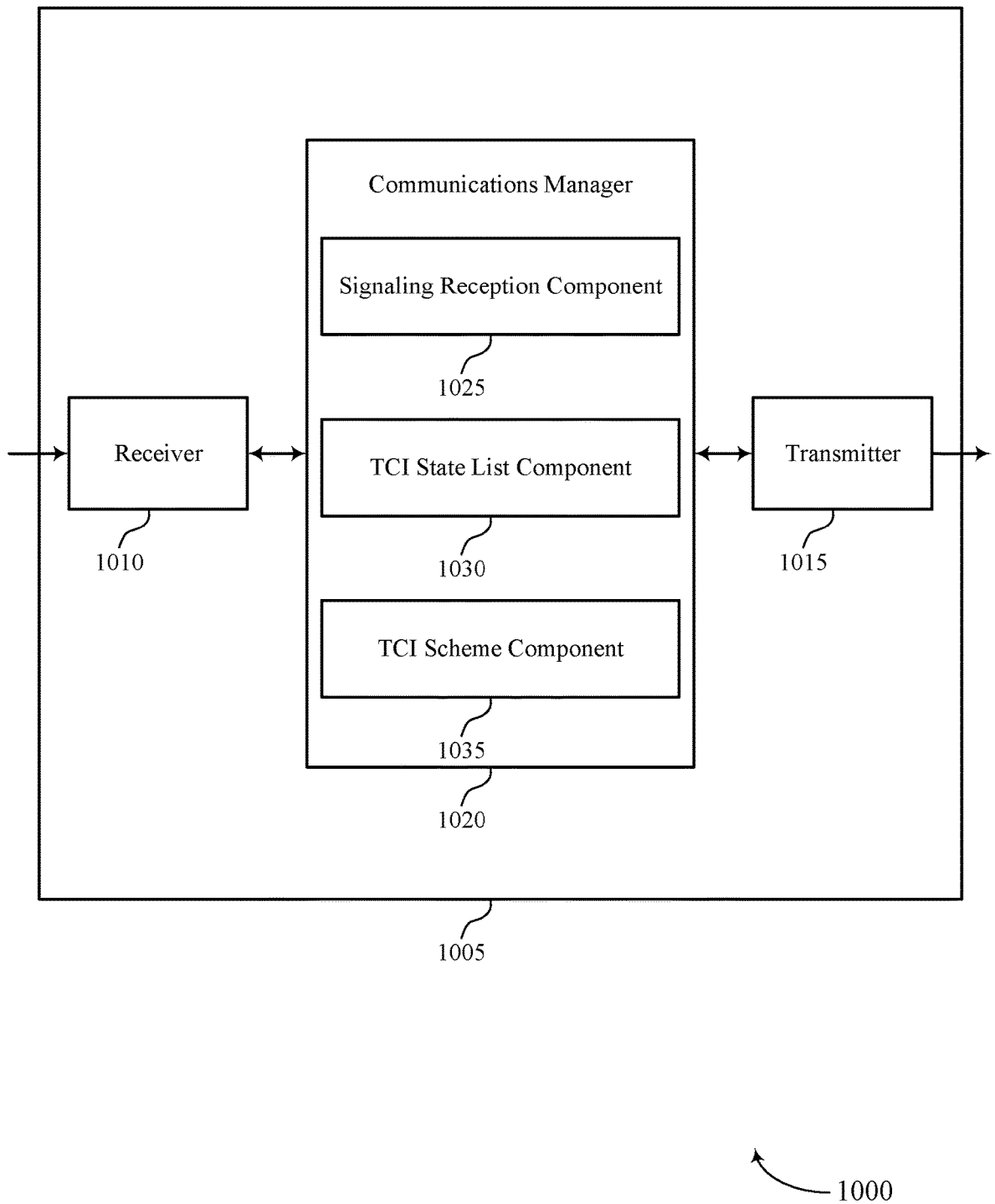

FIG. 10 shows a block diagram 1000 of a device 1005 that supports techniques for configuring TCI states for MBS transmissions in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for configuring TCI states for MBS transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for configuring TCI states for MBS transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for configuring TCI states for MBS transmissions as described herein. For example, the communications manager 1020 may include a signaling reception component 1025, a TCI state list component 1030, a TCI scheme component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The signaling reception component 1025 may be configured as or otherwise support a means for receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The TCI state list component 1030 may be configured as or otherwise support a means for determining, based on the group of transmission configuration indicator states, a transmission configuration indicator state list arrangement indicating a first state list associated with the first bandwidth part and a second state list associated with the common frequency resource. The TCI scheme component 1035 may be configured as or otherwise support a means for selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

Figure 11:
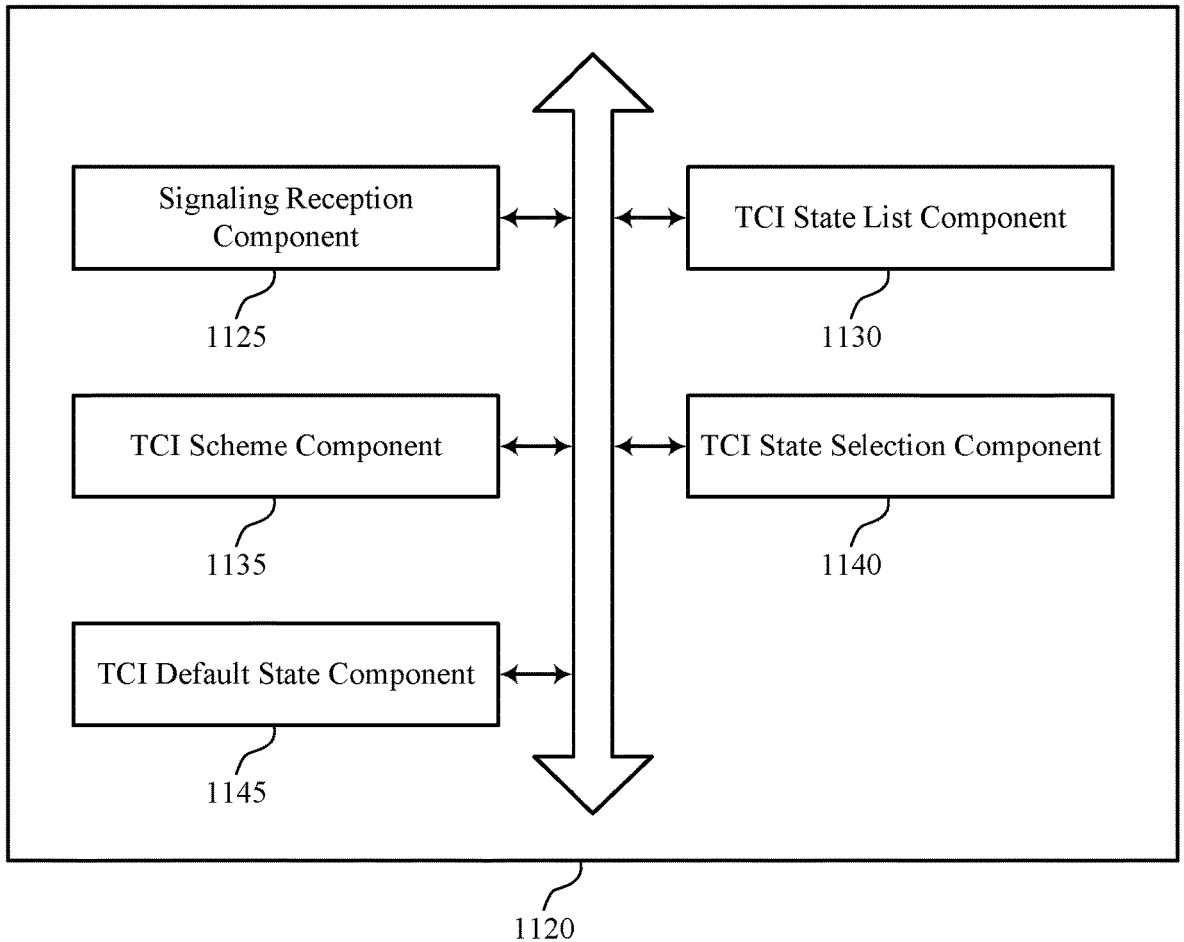
FIG. 11 shows a block diagram of a communications manager that supports techniques for configuring TCI states for MBS transmissions in accordance with aspects of the present disclosure.

FIG. 11 shows a block diagram 1100 of a communications manager 1120 that supports techniques for configuring TCI states for MBS transmissions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for configuring TCI states for MBS transmissions as described herein. For example, the communications manager 1120 may include a signaling reception component 1125, a TCI state list component 1130, a TCI scheme component 1135, a TCI state selection component 1140, a TCI default state component 1145, or any combination thereof. Each of these components may communicate, directly or indirectly, with one another (e.g., via one or more buses).

Additionally or alternatively, the communications manager 1120 may support wireless communications at a UE in accordance with examples as disclosed herein. The signaling reception component 1125 may be configured as or otherwise support a means for receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The TCI state list component 1130 may be configured as or otherwise support a means for determining, based on the group of transmission configuration indicator states, a transmission configuration indicator state list arrangement indicating a first state list associated with the first bandwidth part and a second state list associated with the common frequency resource. The TCI scheme component 1135 may be configured as or otherwise support a means for selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

In some examples, the TCI scheme component 1135 may be configured as or otherwise support a means for selecting the transmission configuration indicator state sharing scheme. In some examples, the TCI state selection component 1140 may be configured as or otherwise support a means for selecting, as one or more transmission configuration indicator states associated with the multicast transmission configuration, one or more transmission configuration indicator states associated with a connected synchronization signal physical broadcast channel block.

In some examples, the TCI scheme component 1135 may be configured as or otherwise support a means for selecting the transmission configuration indicator state separation scheme. In some examples, the TCI state selection component 1140 may be configured as or otherwise support a means for selecting, as one or more transmission configuration indicator states associated with the unicast transmission configuration, one or more transmission configuration indicator states associated with a connected synchronization signal physical broadcast channel block. In some examples, the TCI state selection component 1140 may be configured as or otherwise support a means for selecting, as one or more transmission configuration indicator states associated with the multicast transmission configuration, one or more transmission configuration indicator states associated with the second state list.

In some examples, the TCI scheme component 1135 may be configured as or otherwise support a means for selecting the transmission configuration indicator state sharing scheme. In some examples, the TCI state selection component 1140 may be configured as or otherwise support a means for selecting, as one or more transmission configuration indicator states associated with the unicast transmission configuration and the multicast transmission configuration, one or more transmission configuration indicator states associated with the second state list.

In some examples, the TCI scheme component 1135 may be configured as or otherwise support a means for selecting the transmission configuration indicator state separation scheme. In some examples, the TCI state selection component 1140 may be configured as or otherwise support a means for selecting, as one or more transmission configuration indicator states associated with the unicast transmission configuration, one or more transmission configuration indicator states associated with the first state list. In some examples, the TCI state selection component 1140 may be configured as or otherwise support a means for selecting, as one or more transmission configuration indicator states associated with the multicast transmission configuration, one or more transmission configuration indicator states associated with a connected synchronization signal physical broadcast channel block.

In some examples, the TCI scheme component 1135 may be configured as or otherwise support a means for selecting the transmission configuration indicator state sharing scheme. In some examples, the TCI state selection component 1140 may be configured as or otherwise support a means for selecting, as one or more transmission configuration indicator states associated with the unicast transmission configuration and the multicast transmission configuration, one or more transmission configuration indicator states associated with the first state list.

In some examples, the TCI scheme component 1135 may be configured as or otherwise support a means for selecting the transmission configuration indicator state separation scheme. In some examples, the TCI state selection component 1140 may be configured as or otherwise support a means for selecting, as one or more transmission configuration indicator states associated with the unicast transmission configuration, one or more transmission configuration indicator states associated with the first state list. In some examples, the TCI state selection component 1140 may be configured as or otherwise support a means for selecting, as one or more transmission configuration indicator states associated with the multicast transmission configuration, one or more transmission configuration indicator states associated with the second state list.

In some examples, the TCI scheme component 1135 may be configured as or otherwise support a means for selecting the transmission configuration indicator state sharing scheme. In some examples, the TCI state selection component 1140 may be configured as or otherwise support a means for selecting, as one or more transmission configuration indicator states associated with the unicast transmission configuration, one or more transmission configuration indicator states associated with the first state list and one or more transmission configuration indicator states associated with the second state list. In some examples, the TCI state selection component 1140 may be configured as or otherwise support a means for selecting, as one or more transmission configuration indicator states associated with the multicast transmission configuration, one or more transmission configuration indicator states associated with the second state list.

In some examples, the TCI scheme component 1135 may be configured as or otherwise support a means for selecting the transmission configuration indicator state sharing scheme. In some examples, the TCI state selection component 1140 may be configured as or otherwise support a means for selecting, as one or more transmission configuration indicator states associated with the unicast transmission configuration, one or more transmission configuration indicator states associated with the first state list. In some examples, the TCI state selection component 1140 may be configured as or otherwise support a means for selecting, as one or more transmission configuration indicator states associated with the multicast transmission configuration, one or more transmission configuration indicator states associated with the first state list and one or more transmission configuration indicator states associated with the second state list.

In some examples, the TCI scheme component 1135 may be configured as or otherwise support a means for selecting the transmission configuration indicator state sharing scheme. In some examples, the TCI state selection component 1140 may be configured as or otherwise support a means for selecting, as one or more transmission configuration indicator states associated with the unicast transmission configuration and the multicast transmission configuration, one or more transmission configuration indicator states associated with the first state list and one or more transmission configuration indicator states associated with the second state list.

In some examples, the signaling reception component 1125 may be configured as or otherwise support a means for receiving control signaling indicating that one or more transmission configuration indicator states of the first state list or the second state list are to be included in the unicast transmission configuration, the multicast transmission configuration, or both.

In some examples, the TCI default state component 1145 may be configured as or otherwise support a means for determining a default transmission configuration indicator state for a multicast transmission, a unicast transmission, or both, based on a control resource set identifier configured for a unicast transmission, a control resource set identifier configured for multicast transmission, or both.

In some examples, the first bandwidth part is used to receive a unicast transmission and the common frequency resource is confined within the first bandwidth part and used to receive a multicast transmission.

Figure 12:
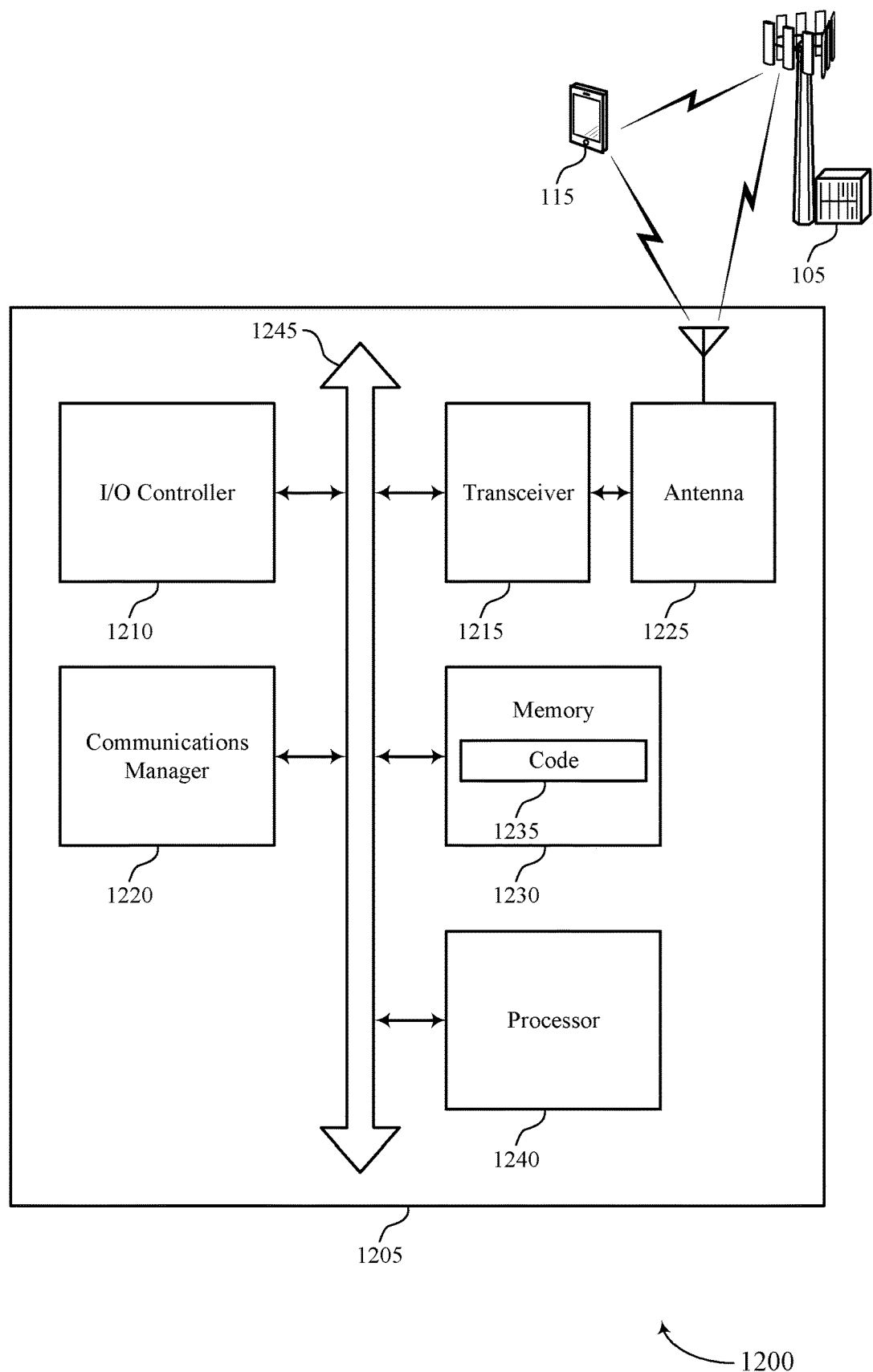
FIG. 12 shows a diagram of a system including a device that supports techniques for configuring TCI states for MBS transmissions in accordance with aspects of the present disclosure.

FIG. 12 shows a diagram of a system 1200 including a device 1205 that supports techniques for configuring TCI states for MBS transmissions in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for configuring TCI states for MBS transmissions). For example, the device 1205 or a component of the device 1205 may include a processor 1240 and memory 1230 coupled to the processor 1240, the processor 1240 and memory 1230 configured to perform various functions described herein.

Additionally or alternatively, the communications manager 1220 may support wireless communications at a UE in accordance with examples as disclosed herein. For example, the communications manager 1220 may be configured as or otherwise support a means for receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The communications manager 1220 may be configured as or otherwise support a means for determining, based on the group of transmission configuration indicator states, a transmission configuration indicator state list arrangement indicating a first state list associated with the first bandwidth part and a second state list associated with the common frequency resource. The communications manager 1220 may be configured as or otherwise support a means for selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for configuring TCI states for MBS transmissions as described herein, or the processor 1240 and the memory 1230 may be otherwise configured to perform or support such operations.

Figure 13:
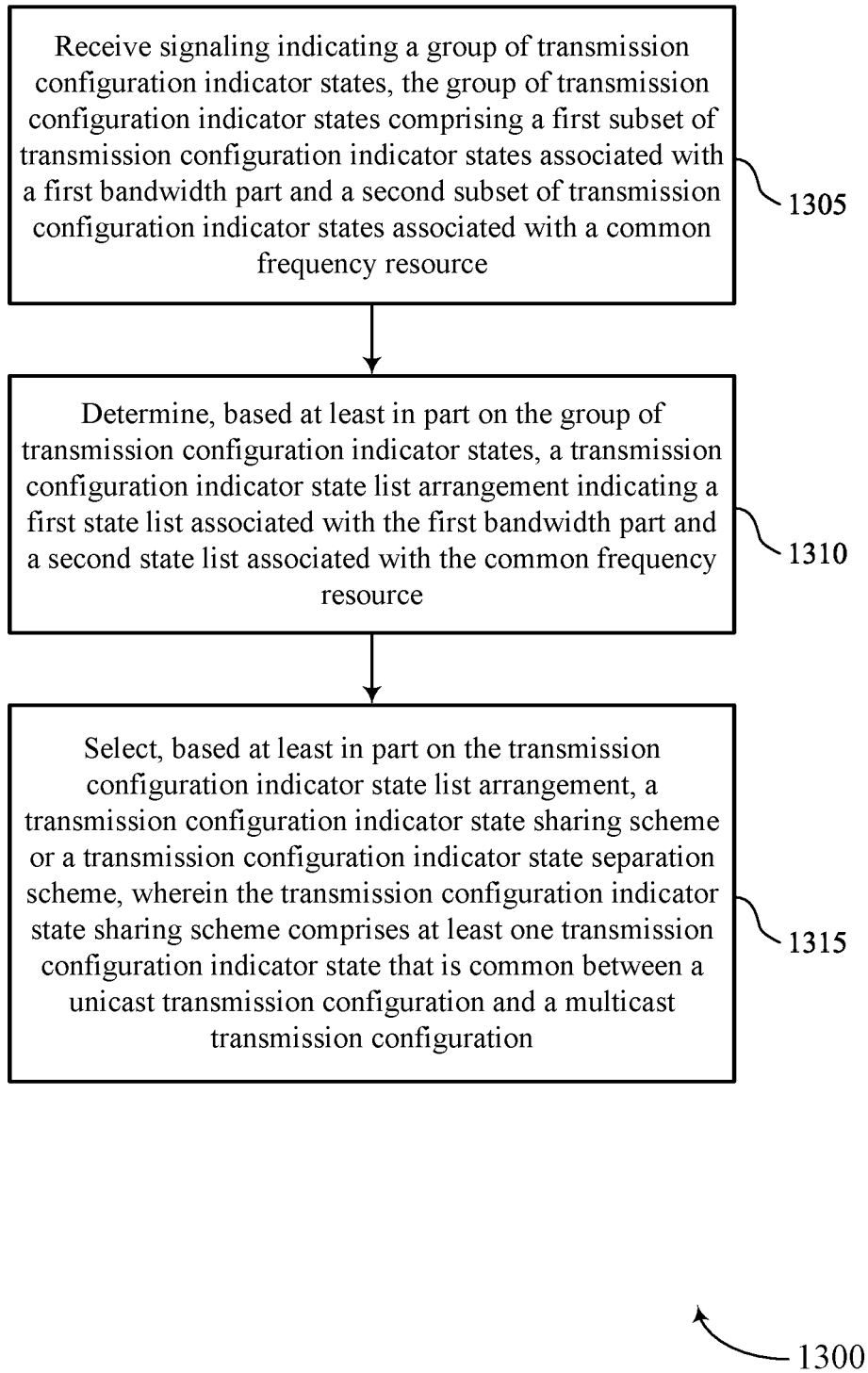
FIGS. 13 through 16 show flowcharts illustrating methods that support techniques for configuring TCI states for MBS transmissions in accordance with aspects of the present disclosure.

FIG. 13 shows a flowchart illustrating a method 1300 that supports techniques for configuring TCI states for MBS transmissions in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The operations of 1305 may be performed in accordance with examples as disclosed herein. In some examples, aspects of the operations of 1305 may be performed by a signaling reception component 1125 as described with reference to FIG. 11.

At 1310, the method may include determining, based on the group of transmission configuration indicator states, a transmission configuration indicator state list arrangement indicating a first state list associated with the first bandwidth part and a second state list associated with the common frequency resource. The operations of 1310 may be performed in accordance with examples as disclosed herein. In some examples, aspects of the operations of 1310 may be performed by a TCI state list component 1130 as described with reference to FIG. 11.

At 1315, the method may include selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration. The operations of 1315 may be performed in accordance with examples as disclosed herein. In some examples, aspects of the operations of 1315 may be performed by a TCI scheme component 1135 as described with reference to FIG. 11.

Figure 14:
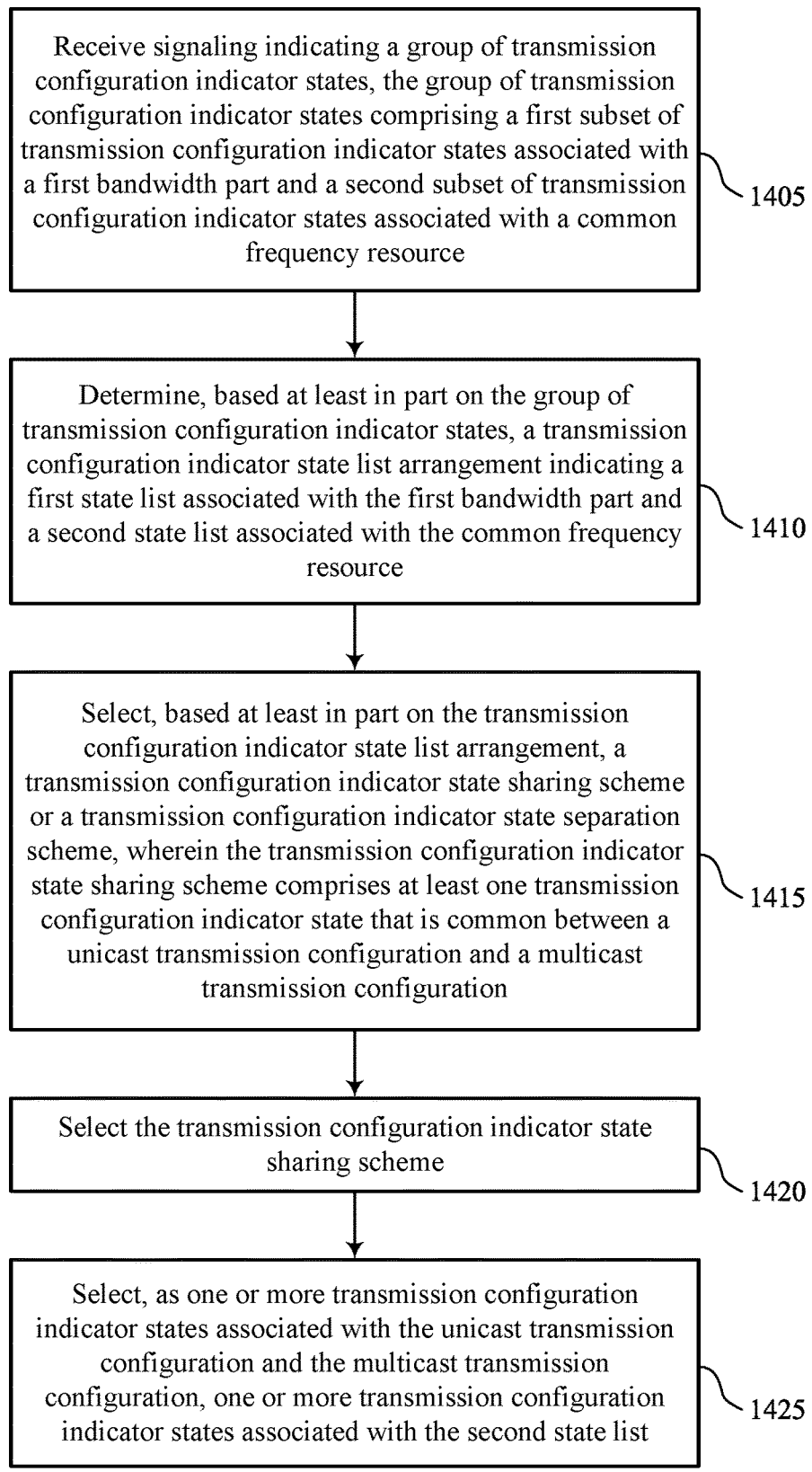

FIG. 14 shows a flowchart illustrating a method 1400 that supports techniques for configuring TCI states for MBS transmissions in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The operations of 1405 may be performed in accordance with examples as disclosed herein. In some examples, aspects of the operations of 1405 may be performed by a signaling reception component 1125 as described with reference to FIG. 11.

At 1410, the method may include determining, based on the group of transmission configuration indicator states, a transmission configuration indicator state list arrangement indicating a first state list associated with the first bandwidth part and a second state list associated with the common frequency resource. The operations of 1410 may be performed in accordance with examples as disclosed herein. In some examples, aspects of the operations of 1410 may be performed by a TCI state list component 1130 as described with reference to FIG. 11.

At 1415, the method may include selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration. The operations of 1415 may be performed in accordance with examples as disclosed herein. In some examples, aspects of the operations of 1415 may be performed by a TCI scheme component 1135 as described with reference to FIG. 11.

At 1420, the method may include selecting the transmission configuration indicator state sharing scheme. The operations of 1420 may be performed in accordance with examples as disclosed herein. In some examples, aspects of the operations of 1420 may be performed by a TCI scheme component 1135 as described with reference to FIG. 11.

At 1425, the method may include selecting, as one or more transmission configuration indicator states associated with the unicast transmission configuration and the multicast transmission configuration, one or more transmission configuration indicator states associated with the second state list. The operations of 1425 may be performed in accordance with examples as disclosed herein. In some examples, aspects of the operations of 1425 may be performed by a TCI state selection component 1140 as described with reference to FIG. 11.

Figure 15:
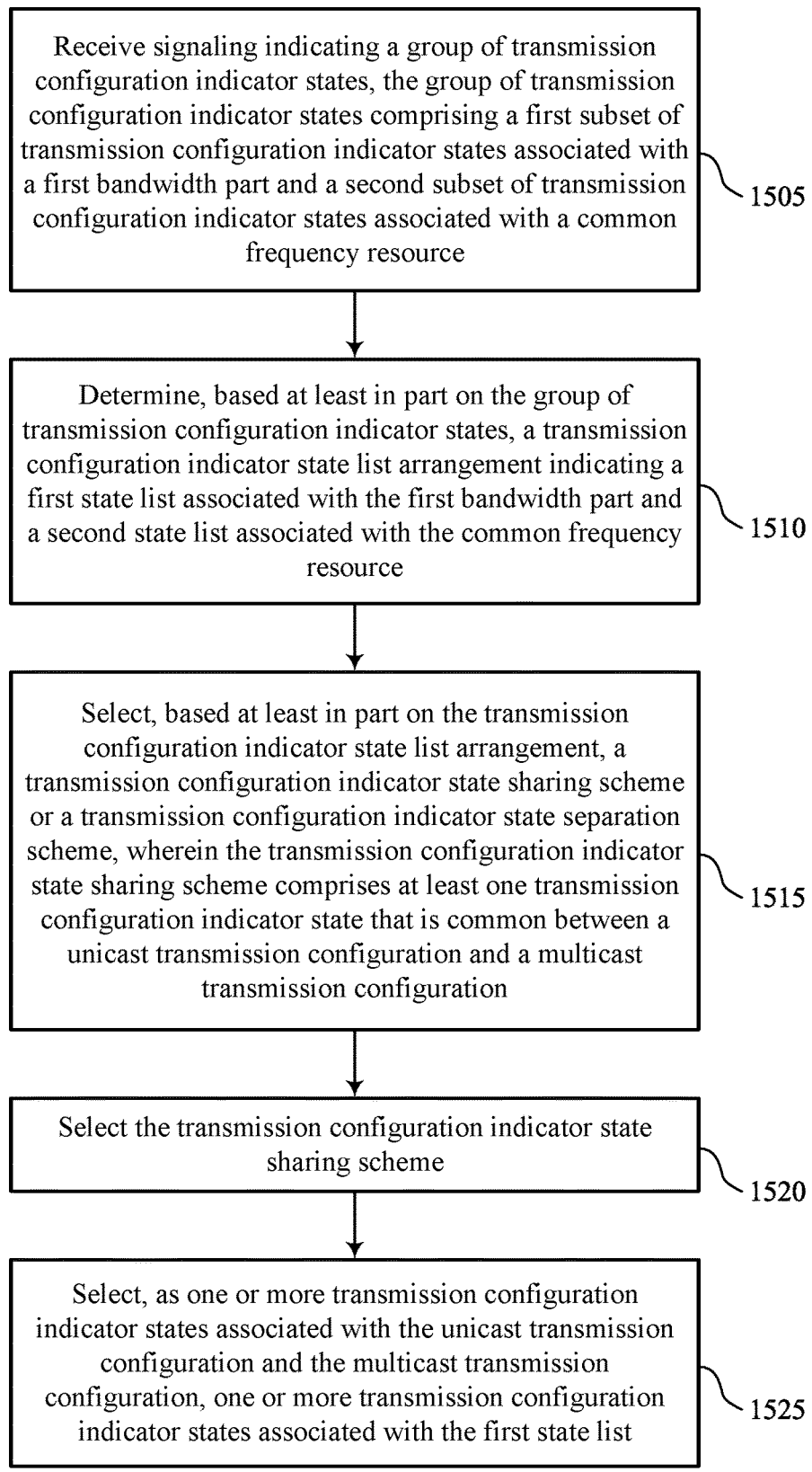

FIG. 15 shows a flowchart illustrating a method 1500 that supports techniques for configuring TCI states for MBS transmissions in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The operations of 1505 may be performed in accordance with examples as disclosed herein. In some examples, aspects of the operations of 1505 may be performed by a signaling reception component 1125 as described with reference to FIG. 11.

At 1510, the method may include determining, based on the group of transmission configuration indicator states, a transmission configuration indicator state list arrangement indicating a first state list associated with the first bandwidth part and a second state list associated with the common frequency resource. The operations of 1510 may be performed in accordance with examples as disclosed herein. In some examples, aspects of the operations of 1510 may be performed by a TCI state list component 1130 as described with reference to FIG. 11.

At 1515, the method may include selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration. The operations of 1515 may be performed in accordance with examples as disclosed herein. In some examples, aspects of the operations of 1515 may be performed by a TCI scheme component 1135 as described with reference to FIG. 11.

At 1520, the method may include selecting the transmission configuration indicator state sharing scheme. The operations of 1520 may be performed in accordance with examples as disclosed herein. In some examples, aspects of the operations of 1520 may be performed by a TCI scheme component 1135 as described with reference to FIG. 11.

At 1525, the method may include selecting, as one or more transmission configuration indicator states associated with the unicast transmission configuration and the multicast transmission configuration, one or more transmission configuration indicator states associated with the first state list. The operations of 1525 may be performed in accordance with examples as disclosed herein. In some examples, aspects of the operations of 1525 may be performed by a TCI state selection component 1140 as described with reference to FIG. 11.

Figure 16:
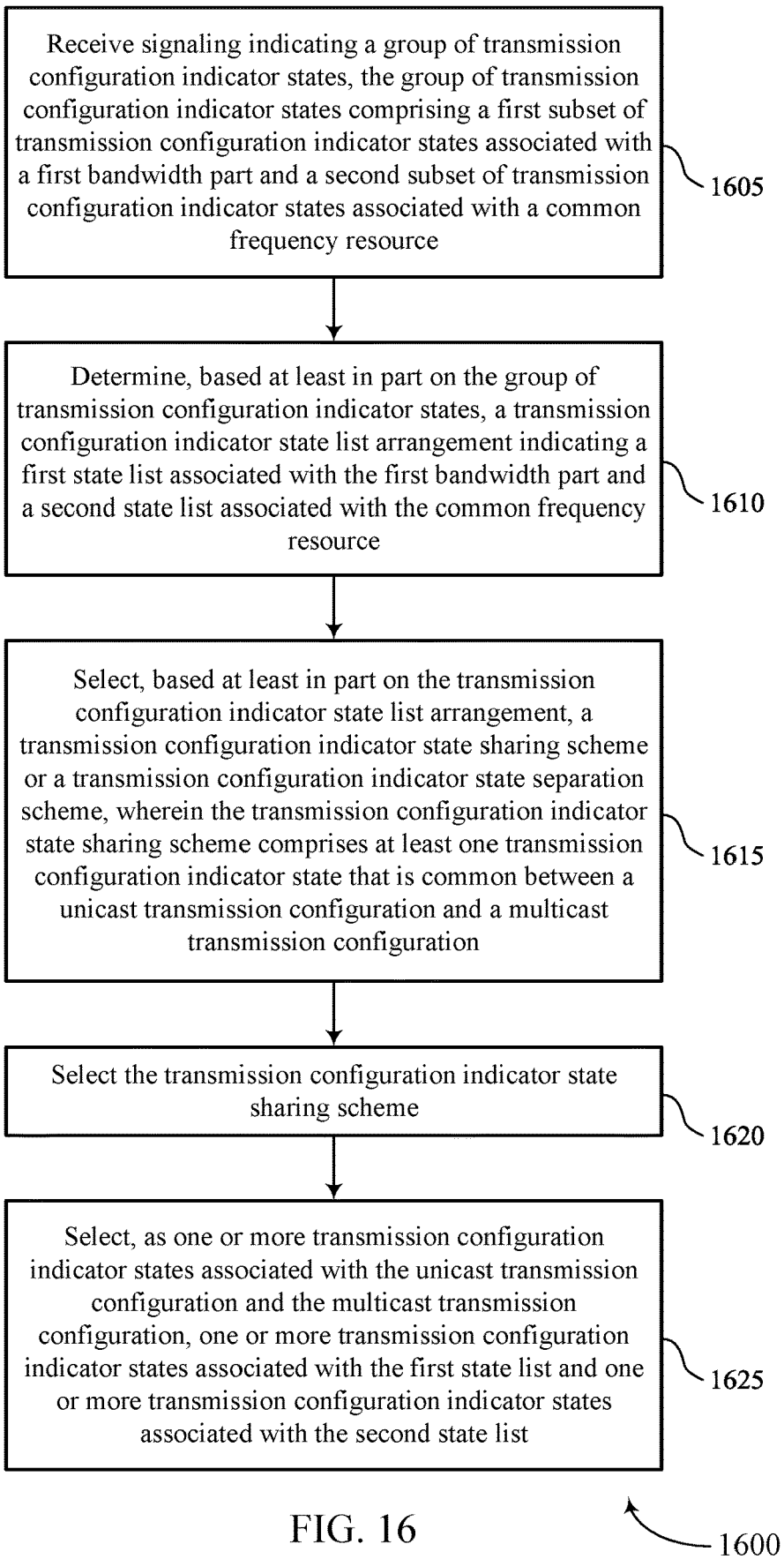

FIG. 16 shows a flowchart illustrating a method 1600 that supports techniques for configuring TCI states for MBS transmissions in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include receiving signaling indicating a group of transmission configuration indicator states, the group of transmission configuration indicator states including a first subset of transmission configuration indicator states associated with a first bandwidth part and a second subset of transmission configuration indicator states associated with a common frequency resource. The operations of 1605 may be performed in accordance with examples as disclosed herein. In some examples, aspects of the operations of 1605 may be performed by a signaling reception component 1125 as described with reference to FIG. 11.

At 1610, the method may include determining, based on the group of transmission configuration indicator states, a transmission configuration indicator state list arrangement indicating a first state list associated with the first bandwidth part and a second state list associated with the common frequency resource. The operations of 1610 may be performed in accordance with examples as disclosed herein. In some examples, aspects of the operations of 1610 may be performed by a TCI state list component 1130 as described with reference to FIG. 11.

At 1615, the method may include selecting, based on the transmission configuration indicator state list arrangement, a transmission configuration indicator state sharing scheme or a transmission configuration indicator state separation scheme, where the transmission configuration indicator state sharing scheme includes at least one transmission configuration indicator state that is common between a unicast transmission configuration and a multicast transmission configuration. The operations of 1615 may be performed in accordance with examples as disclosed herein. In some examples, aspects of the operations of 1615 may be performed by a TCI scheme component 1135 as described with reference to FIG. 11.

At 1620, the method may include selecting the transmission configuration indicator state sharing scheme. The operations of 1620 may be performed in accordance with examples as disclosed herein. In some examples, aspects of the operations of 1620 may be performed by a TCI scheme component 1135 as described with reference to FIG. 11.

At 1625, the method may include selecting, as one or more transmission configuration indicator states associated with the unicast transmission configuration and the multicast transmission configuration, one or more transmission configuration indicator states associated with the first state list and one or more transmission configuration indicator states associated with the second state list. The operations of 1625 may be performed in accordance with examples as disclosed herein. In some examples, aspects of the operations of 1625 may be performed by a TCI state selection component 1140 as described with reference to FIG. 11.

The following provides an overview of aspects of the present disclosure:

Aspect 1: A method for wireless communications at a UE, comprising: receiving signaling indicating a group of transmission configuration indicator states, the group of transmission configuration indicator states comprising a first subset of transmission configuration indicator states associated with a first bandwidth part and a second subset of transmission configuration indicator states associated with a common frequency resource; determining, based at least in part on the group of transmission configuration indicator states, a transmission configuration indicator state list arrangement indicating a first state list associated with the first bandwidth part and a second state list associated with the common frequency resource; and selecting, based at least in part on the transmission configuration indicator state list arrangement, a transmission configuration indicator state sharing scheme or a transmission configuration indicator state separation scheme, wherein the transmission configuration indicator state sharing scheme comprises at least one transmission configuration indicator state that is common between a unicast transmission configuration and a multicast transmission configuration.

Aspect 2: The method of aspect 1, further comprising: selecting the transmission configuration indicator state sharing scheme; and selecting, as one or more transmission configuration indicator states associated with the multicast transmission configuration, one or more transmission configuration indicator states associated with a connected synchronization signal physical broadcast channel block.

Aspect 3: The method of any of aspects 1 through 2, further comprising: selecting the transmission configuration indicator state separation scheme; selecting, as one or more transmission configuration indicator states associated with the unicast transmission configuration, one or more transmission configuration indicator states associated with a connected synchronization signal physical broadcast channel block; and selecting, as one or more transmission configuration indicator states associated with the multicast transmission configuration, one or more transmission configuration indicator states associated with the second state list.

Aspect 4: The method of any of aspects 1 through 3, further comprising: selecting the transmission configuration indicator state sharing scheme; and selecting, as one or more transmission configuration indicator states associated with the unicast transmission configuration and the multicast transmission configuration, one or more transmission configuration indicator states associated with the second state list.

Aspect 5: The method of any of aspects 1 through 4, further comprising: selecting the transmission configuration indicator state separation scheme; selecting, as one or more transmission configuration indicator states associated with the unicast transmission configuration, one or more transmission configuration indicator states associated with the first state list; and selecting, as one or more transmission configuration indicator states associated with the multicast transmission configuration, one or more transmission configuration indicator states associated with a connected synchronization signal physical broadcast channel block.

Aspect 6: The method of any of aspects 1 through 5, further comprising: selecting the transmission configuration indicator state sharing scheme; and selecting, as one or more transmission configuration indicator states associated with the unicast transmission configuration and the multicast transmission configuration, one or more transmission configuration indicator states associated with the first state list.

Aspect 7: The method of any of aspects 1 through 6, further comprising: selecting the transmission configuration indicator state separation scheme; selecting, as one or more transmission configuration indicator states associated with the unicast transmission configuration, one or more transmission configuration indicator states associated with the first state list; and selecting, as one or more transmission configuration indicator states associated with the multicast transmission configuration, one or more transmission configuration indicator states associated with the second state list.

Aspect 8: The method of any of aspects 1 through 7, further comprising: selecting the transmission configuration indicator state sharing scheme; selecting, as one or more transmission configuration indicator states associated with the unicast transmission configuration, one or more transmission configuration indicator states associated with the first state list and one or more transmission configuration indicator states associated with the second state list; and selecting, as one or more transmission configuration indicator states associated with the multicast transmission configuration, one or more transmission configuration indicator states associated with the second state list.

Aspect 9: The method of any of aspects 1 through 8, further comprising: selecting the transmission configuration indicator state sharing scheme; selecting, as one or more transmission configuration indicator states associated with the unicast transmission configuration, one or more transmission configuration indicator states associated with the first state list; and selecting, as one or more transmission configuration indicator states associated with the multicast transmission configuration, one or more transmission configuration indicator states associated with the first state list and one or more transmission configuration indicator states associated with the second state list.

Aspect 10: The method of any of aspects 1 through 9, further comprising: selecting the transmission configuration indicator state sharing scheme; and selecting, as one or more transmission configuration indicator states associated with the unicast transmission configuration and the multicast transmission configuration, one or more transmission configuration indicator states associated with the first state list and one or more transmission configuration indicator states associated with the second state list.

Aspect 11: The method of any of aspects 1 through 10, further comprising: receiving control signaling indicating that one or more transmission configuration indicator states of the first state list or the second state list are to be included in the unicast transmission configuration, the multicast transmission configuration, or both.

Aspect 12: The method of any of aspects 1 through 11, further comprising: determining a default transmission configuration indicator state for a multicast transmission, a unicast transmission, or both, based at least in part on a control resource set identifier configured for a unicast transmission, a control resource set identifier configured for multicast transmission, or both.

Aspect 13: The method of any of aspects 1 through 12, wherein the first bandwidth part is used to receive a unicast transmission and the common frequency resource is confined within the first bandwidth part and used to receive a multicast transmission.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    at least one processor; and
    at least one memory coupled with the at least one processor with instructions stored in the at least one memory, the instructions being executable by the at least one processor, individually or in any combination, to cause the apparatus to:
    receive downlink shared channel unicast configuration signaling indicating a group of transmission configuration indicator states, the group of transmission configuration indicator states being applicable for receiving unicast data on a first bandwidth part and for receiving multicast data on a common frequency resource associated with the first bandwidth part;
    select, from the group of transmission configuration indicator states indicated in the downlink shared channel unicast configuration signaling, a first transmission configuration indicator state for receiving multicast data on the common frequency resource; and
    select, from the group of transmission configuration indicator states indicated in the downlink shared channel unicast configuration signaling, a second transmission configuration indicator state for receiving unicast data on the first bandwidth part, wherein the second transmission configuration indicator state is different than the first transmission configuration indicator state.

2. The apparatus of claim 1, wherein the first transmission configuration indicator state is associated with a connected synchronization signal physical broadcast channel block.

3. The apparatus of claim 1, wherein the second transmission configuration indicator state is associated with a connected synchronization signal physical broadcast channel block.

4. The apparatus of claim 1, wherein the instructions are further executable by the at least one processor to cause the apparatus to:
    receive control signaling indicating that one or more transmission configuration indicator states of the group of transmission configuration indicator states are to be included in a unicast transmission configuration, a multi cast transmission configuration, or both.

5. The apparatus of claim 1, wherein the instructions are further executable by the at least one processor to cause the apparatus to:
    activate, with a medium access control control element, one or more transmission configuration indicator states of the group of transmission configuration indicator states.

6. The apparatus of claim 1, wherein the instructions are further executable by the at least one processor to cause the apparatus to:
    determine a default transmission configuration indicator state for the first transmission configuration indicator state based at least in part on a control resource set identifier configured for receiving a multicast transmission.

7. The apparatus of claim 1, wherein the instructions are further executable by the at least one processor to cause the apparatus to:
    determine a default transmission configuration indicator state for the second transmission configuration indicator state based at least in part on a control resource set identifier configured for receiving a unicast transmission or a multicast transmission.

8. The apparatus of claim 1, wherein the first bandwidth part is used to receive a unicast transmission and the common frequency resource is confined within the first bandwidth part and is used to receive a multicast transmission.

9. A method for wireless communications at a user equipment (UE), comprising:
    receiving downlink shared channel unicast configuration signaling indicating a group of transmission configuration indicator states, the group of transmission configuration indicator states being applicable for receiving unicast data on a first bandwidth part and for receiving multicast data on a common frequency resource associated with the first bandwidth part;
    selecting, from the group of transmission configuration indicator states indicated in the downlink shared channel unicast configuration signaling, a first transmission configuration indicator state for receiving multicast data on the common frequency resource; and
    selecting, from the group of transmission configuration indicator states indicated in the downlink shared channel unicast configuration signaling, a second transmission configuration indicator state for receiving unicast data on the first bandwidth part, wherein the second transmission configuration indicator state is different than the first transmission configuration indicator state.

10. The method of claim 9, wherein the first transmission configuration indicator state is associated with a connected synchronization signal physical broadcast channel block.

11. The method of claim 9, wherein the second transmission configuration indicator state is associated with a connected synchronization signal physical broadcast channel block.

12. The method of claim 9, further comprising:
receiving control signaling indicating that one or more transmission configuration indicator states of the group of transmission configuration indicator states are to be included in a unicast transmission configuration, a multi cast transmission configuration, or both.

13. The method of claim 9, further comprising:
determining a default transmission configuration indicator state for the first transmission configuration indicator state, the second transmission configuration indicator state, or both, based at least in part on a control resource set identifier configured for receiving a unicast transmission, a control resource set identifier configured for receiving multicast transmission, or both.

14. The method of claim 9, wherein the first bandwidth part is used to receive a unicast transmission and the common frequency resource is confined within the first bandwidth part and is used to receive a multicast transmission.

15. An apparatus for wireless communications at a user equipment (UE), comprising:
means for receiving downlink shared channel unicast configuration signaling indicating a group of transmission configuration indicator states, the group of transmission configuration indicator states being applicable for receiving unicast data on a first bandwidth part and for receiving multicast data on a common frequency resource associated with the first bandwidth part;
means for selecting, from the group of transmission configuration indicator states indicated in the downlink shared channel unicast configuration signaling, a first transmission configuration indicator state for receiving multicast data on the common frequency resource; and
means for selecting, from the group of transmission configuration indicator states indicated in the downlink shared channel unicast configuration signaling, a second transmission configuration indicator state for receiving unicast data on the first bandwidth part, wherein the second transmission configuration indicator state is different than the first transmission configuration indicator state.

16. A non-transitory computer-readable medium storing code for wireless communications at a user equipment (UE), the code comprising instructions executable by a processor to:
receive downlink shared channel unicast configuration signaling indicating a group of transmission configuration indicator states, the group of transmission configuration indicator states being applicable for receiving unicast data on a first bandwidth part and for receiving multicast data on a common frequency resource associated with the first bandwidth part;
select, from the group of transmission configuration indicator states indicated in the downlink shared channel unicast configuration signaling, a first transmission configuration indicator state for receiving multicast data on the common frequency resource; and
select, from the group of transmission configuration indicator states indicated in the downlink shared channel unicast configuration signaling, a second transmission configuration indicator state for receiving unicast data on the first bandwidth part, wherein the second transmission configuration indicator state is different than the first transmission configuration indicator state.

17. An apparatus for wireless communications at a user equipment (UE), comprising:
at least one processor; and
at least one memory coupled with the at least one processor with instructions stored in the at least one memory, the instructions being executable by the at least one processor, individually or in combination, to cause the apparatus to:
receive a first configuration for receiving unicast data in a first bandwidth part, the first configuration comprising a group of transmission configuration indicator (TCI) states, wherein one or more TCI states of the group of TCI states are expressed with a same bitwidth and a same set of codepoints as a TCI state associated with receiving multicast data;
receive a second configuration for receiving multicast data in a common frequency resource (CFR), the second configuration not comprising a group of transmission configuration indicator (TCI) states;
receive a downlink (DL) grant for receiving multicast data;
determine, based at least in part on the group of transmission configuration indicator (TCI) states, the same bitwidth, the same set of codepoints, and the DL grant, a TCI state for receiving the multicast data; and
receive the multicast data based on the determined TCI state.

18. A method for wireless communications at a user equipment (UE), comprising:
receiving a first configuration for receiving unicast data in a first bandwidth part, the first configuration comprising a group of transmission configuration indicator (TCI) states, wherein one or more TCI states of the group of TCI states are expressed with a same bitwidth and a same set of codepoints as a TCI state associated with receiving multicast data;
receiving a second configuration for receiving multicast data in a common frequency resource (CFR), the second configuration not comprising a group of transmission configuration indicator (TCI) states;
receiving a downlink (DL) grant for receiving multicast data;
determining, based at least in part on the group of transmission configuration indicator (TCI) states, the same bitwidth, the same set of codepoints, and the DL grant, a TCI state for receiving the multicast data; and
receiving the multicast data based on the determined TCI state.

* * * * *